(12) United States Patent
Ahn

(10) Patent No.: US 11,258,578 B2
(45) Date of Patent: Feb. 22, 2022

(54) CLOCK DATA RECOVERY UNIT

(71) Applicant: Samsung Display Co., Ltd., Yongin-si (KR)

(72) Inventor: Jeong Keun Ahn, Yongin-si (KR)

(73) Assignee: Samsung Display Co., Ltd., Yongin-si (KR)

(*) Notice: Subject to any disclaimer, the term of this patent is extended or adjusted under 35 U.S.C. 154(b) by 0 days.

(21) Appl. No.: 17/248,931

(22) Filed: Feb. 12, 2021

(65) Prior Publication Data

US 2021/0320782 A1 Oct. 14, 2021

(30) Foreign Application Priority Data

Apr. 8, 2020 (KR) .................. 10-2020-0042872

(51) Int. Cl.
*H04L 7/00* (2006.01)
*H04L 7/033* (2006.01)

(52) U.S. Cl.
CPC .......... *H04L 7/0332* (2013.01); *H04L 7/0004* (2013.01)

(58) Field of Classification Search
CPC ... H04L 7/0332; H04L 7/0004; H04L 25/063; H04L 7/0338; H04L 7/0331; H04L 25/03885; H04L 7/033; H03K 5/153; H03K 5/08
USPC ........ 375/355, 257, 258, 373–376, 326, 327
See application file for complete search history.

(56) References Cited

U.S. PATENT DOCUMENTS

| | | | |
|---|---|---|---|
| 7,193,539 B2 | 3/2007 | Kim et al. | |
| 7,212,580 B2* | 5/2007 | Hietala | H03K 5/08 375/286 |
| 9,490,908 B2 | 11/2016 | Bottacchi | |
| 10,623,052 B2 | 4/2020 | Ahn | |
| 2004/0086225 A1 | 5/2004 | Kim et al. | |
| 2005/0058234 A1* | 3/2005 | Stojanovic | H04L 7/0331 375/371 |
| 2006/0008040 A1* | 1/2006 | Vallet | H04L 7/0338 375/371 |
| 2010/0150289 A1* | 6/2010 | Sunaga | H04L 7/033 375/371 |

(Continued)

FOREIGN PATENT DOCUMENTS

| | | |
|---|---|---|
| KR | 10-0492971 B1 | 6/2005 |
| KR | 10-0593998 B1 | 7/2006 |

(Continued)

*Primary Examiner* — Phuong Phu
(74) *Attorney, Agent, or Firm* — Lewis Roca Rothgerber Christie LLP

(57) ABSTRACT

A clock data recovery unit includes: a phase corrector generating a first compensation clock signal and a second compensation clock signal based on an external clock signal; and a transition detector, wherein the transition detector comprises: a first integrator configured to integrate a first training pattern signal according to the first compensation clock signal to provide a first integration signal; and a second integrator configured to integrate the first training pattern signal according to the second compensation clock signal to provide a second integration signal, wherein, in response to the first integration signal being greater than a first reference voltage and the second integration signal being less than the first reference voltage, occurrence of a transition of the first training pattern signal is detected.

19 Claims, 16 Drawing Sheets

(56) References Cited

U.S. PATENT DOCUMENTS

| | | | | |
|---|---|---|---|---|
| 2010/0220828 A1* | 9/2010 | Fuller | ................... | H04L 25/063 375/355 |
| 2010/0327924 A1* | 12/2010 | Hasegawa | ......... | H04L 25/03885 327/155 |
| 2014/0286466 A1* | 9/2014 | Sengoku | ................ | H03K 5/153 375/354 |
| 2020/0119955 A1 | 4/2020 | Ahn | | |

FOREIGN PATENT DOCUMENTS

| KR | 10-2019-0027983 A | 3/2019 |
|---|---|---|
| KR | 10-2020-0041425 A | 4/2020 |

* cited by examiner

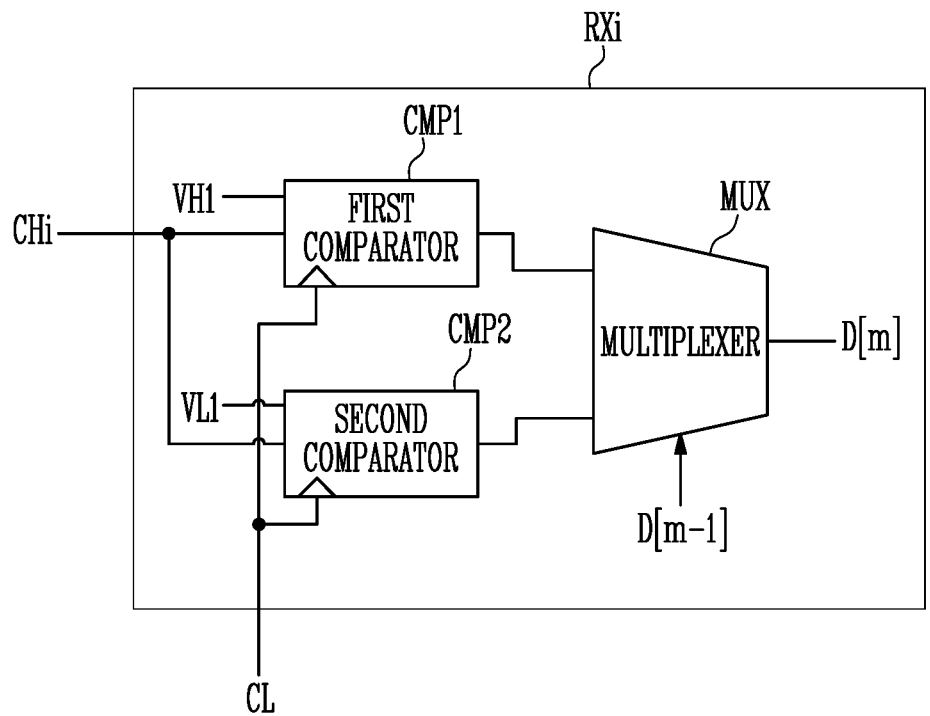

FIG. 6
CH1
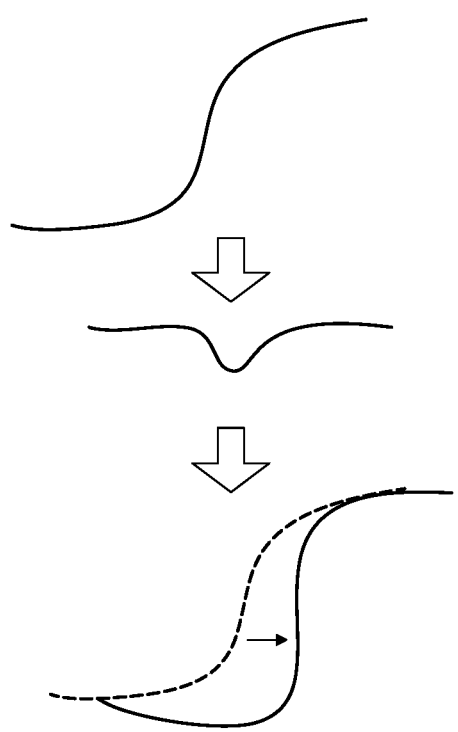
CH2
FIG. 7
CH1
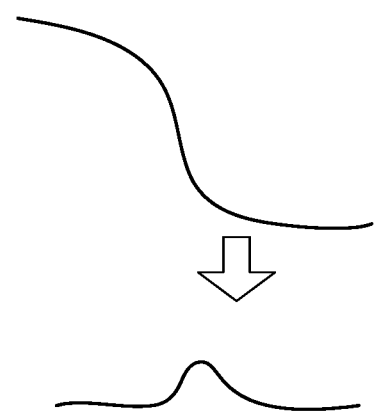
CH2
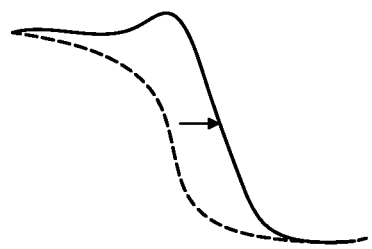

CLOCK DATA RECOVERY UNIT

CROSS-REFERENCE TO RELATED APPLICATION

The present application claims priority to and the benefit of Korean Patent Application No. 10-2020-0042872 filed in the Korean Intellectual Property Office on Apr. 8, 2020, the entire content of which is incorporated herein by reference.

BACKGROUND

1. Field

Aspects of some example embodiments of the present invention relate to a transition detector and a clock data recovery unit including the same.

2. Description of the Related Art

In transmission and reception systems in which a transmitter and a receiver are connected through a single channel, the primary noise that may cause degradation of a signal, is inter-symbol interference (ISI).

In high-speed parallel link systems in which a transmitter and a receiver are connected through a plurality of channels, crosstalk-induced jitter (CIJ) may be generated in addition to ISI.

Because a plurality of clock data recovery units corresponding to the plurality of channels may be used in the receiver, a chip area utilized in the clock data recovery units may be wide, and power consumption and configuration costs may be increased.

The clock data recovery units may utilize transition detectors to recover clock signals, and the transition detectors may use digital data for transition detection. Therefore, because the transition detector may detect only a specific unit interval (UI) rather than a specific time point at which a transition occurs, there may be a limit in recovering a clock signal that is robust to ISI and CIJ.

The above information disclosed in this Background section is only for enhancement of understanding of the background and therefore the information discussed in this Background section does not necessarily constitute prior art.

SUMMARY

Aspects of some example embodiments of the present invention include a transition detector capable of recovering a clock signal robust to inter-symbol interference and crosstalk-induced jitter, and a clock data recovery unit including the same.

A clock data recovery unit according to some example embodiments of the present invention includes: a phase corrector generating a first compensation clock signal and a second compensation clock signal based on an external clock signal; and a transition detector, wherein the transition detector comprises: a first integrator which integrates a first training pattern signal according to the first compensation clock signal to provide a first integration signal; and a second integrator which integrates the first training pattern signal according to the second compensation clock signal to provide a second integration signal, wherein, when the first integration signal is greater than a first reference voltage and the second integration signal is less than the first reference voltage, occurrence of a transition of the first training pattern signal is detected.

According to some example embodiments, a phase of the second compensation clock signal may be more delayed than a phase of the first compensation clock signal.

According to some example embodiments, the transition detector may further include: a first comparator which outputs a logic value of 1 when the first integration signal is greater than the first reference voltage and outputs a logic value of 0 when the first integration signal is less than the first reference voltage; and a second comparator which outputs a logic value of 1 when the second integration signal is greater than the first reference voltage and outputs a logic value of 0 when the second integration signal is less than the first reference voltage.

According to some example embodiments, the transition detector may further include a first inverter which receives an output value of the second comparator.

According to some example embodiments, the transition detector may further include a first NAND gate which outputs a first detection signal based on output values of the first comparator and the first inverter.

According to some example embodiments, the transition detector may further include a first mode signal maintaining unit which provides a first mode signal of a training mode in response to an initialization signal having a turn-on level, wherein the first mode signal maintaining unit provides the first mode signal of a normal mode in response to the first detection signal having a first turn-on level after providing the initialization signal having a turn-on level and then maintains the first mode signal of the normal mode regardless of a level change of the first detection signal.

According to some example embodiments, the first mode signal maintaining unit may include: a first transistor including a gate electrode to which the first detection signal is applied, one electrode which is connected to a first power supply, and the other electrode which is connected to a first sensing node; a second transistor including one electrode which is connected to the first power supply and the other electrode which is connected to the first sensing node; a third transistor including a gate electrode to which the initialization signal is applied, one electrode which is connected to the first sensing node, and the other electrode which is connected to a second power supply; and a second inverter including an input terminal which is connected to the first sensing node and an output terminal which is connected to a gate electrode of the second transistor.

According to some example embodiments, the first mode signal maintaining unit may further include: a third inverter including an input terminal which is connected to the first sensing node; and a fourth inverter including an input terminal which is connected to an output terminal of the third inverter and outputting the first mode signal.

According to some example embodiments, the transition detector may further include: a third integrator which integrates a second training pattern signal according to a third compensation clock signal to provide a third integration signal; and a fourth integrator which integrates the second training pattern signal according to a fourth compensation clock signal to provide a fourth integration signal, wherein, when the third integration signal is less than a second reference voltage and the fourth integration signal is greater than the second reference voltage, occurrence of a transition of the second training pattern signal is detected.

According to some example embodiments, the transition detector may further include: a third comparator which outputs a logic value of 1 when the third integration signal is greater than the second reference voltage and outputs a logic value of 0 when the third integration signal is less than the second reference voltage; and a fourth comparator which outputs a logic value of 1 when the fourth integration signal is greater than the second reference voltage and outputs a logic value of 0 when the fourth integration signal is less than the second reference voltage.

According to some example embodiments, the transition detector may further include: a fifth inverter which receives an output value of the third comparator; and a second NAND gate which outputs a second detection signal based on output values of the fifth inverter and the fourth comparator.

According to some example embodiments, the transition detector may further include a second mode signal maintaining unit which provides a second mode signal of the training mode in response to the initialization signal having a turn-on level, wherein the second mode signal maintaining unit provides the first mode signal of the normal mode in response to the second detection signal having a first turn-on level after providing the initialization signal having a turn-on level and then maintains the second mode signal of the normal mode regardless of a level change of the second detection signal.

According to some example embodiments, the second mode signal maintaining unit may include: a fourth transistor including a gate electrode to which the second detection signal is applied, one electrode which is connected to the first power supply, and the other electrode which is connected to a second sensing node; a fifth transistor including one electrode which is connected to the first power supply and the other electrode which is connected to the second sensing node; a sixth transistor including a gate electrode to which the initialization signal is applied, one electrode which is connected to the second sensing node, and the other electrode which is connected to the second power supply; and a sixth inverter including an input terminal which is connected to the second sensing node and an output terminal which is connected to a gate electrode of the fifth transistor.

According to some example embodiments, the second mode signal maintaining unit may further include: a seventh inverter including an input terminal which is connected to the second sensing node; and an eighth inverter including an input terminal which is connected to an output terminal of the seventh inverter and outputting the second mode signal.

According to some example embodiments, the first training pattern signal may include a falling pulse during one unit interval (UI) of one cycle and maintain a high level during the remaining UIs of the one cycle, and the second training pattern signal may include a rising pulse during one UI of one cycle and maintain a low level during the remaining UIs of the one cycle.

According to some example embodiments, the first training pattern signal may include the falling pulse during one UI of one cycle, and the second training pattern signal may include the rising pulse during one UI of the onecycle.

A clock data recovery unit according to some example embodiments of the present invention includes: a phase corrector generating a first compensation clock signal and a second compensation clock signal based on an external clock signal; and a transition detector, wherein the transition detector comprises: a first integrator which integrates a first training pattern signal according to the first compensation clock signal to provide a first integration signal; and a second integrator which integrates the first training pattern signal according to the second compensation clock signal to provide a second integration signal, wherein, when the first integration signal is less than a first reference voltage and the second integration signal is greater than the first reference voltage, occurrence of a transition of the first training pattern signal is detected.

According to some example embodiments, a clock data recovery unit according to some example embodiments of the present invention includes: a phase corrector generating a first compensation clock signal and a second compensation clock signal based on an external clock signal; and a transition detector, wherein the transition detector comprises: a first integrator which integrates a first training pattern signal according to the first compensation clock signal to provide a first integration signal; and a second integrator which integrates the first training pattern signal according to the second compensation clock signal, of which a phase is more delayed than a phase of the first compensation clock signal, to provide a second integration signal, wherein, when the first integration signal is greater than a first reference voltage and the second integration signal is less than the first reference voltage, the phase of the second compensation clock signal is stored as a first phase.

According to some example embodiments, the transition detector may further include: a third integrator which integrates the second training pattern signal to provide a third integration signal; and a fourth integrator which integrates the second training pattern signal according to a fourth compensation clock signal to provide a fourth integration signal, wherein, when the third integration signal is less than a second reference voltage and the fourth integration signal is greater than the second reference voltage, a phase of the fourth compensation clock signal is stored as a second phase According to some example embodiments, when the first phase is more delayed than the second phase, the clock data recovery unit may provide the second compensation clock signal as a sampling clock signal, and when the second phase is more delayed than the first phase, the clock data recovery unit may provide the fourth compensation clock signal as a sampling clock signal.

According to some example embodiments, the first training pattern signal may include a falling pulse during one UI of one cycle and maintain a high level during the remaining UIs of the one cycle, and the second training pattern signal may include a rising pulse during one UI of one cycle and maintain a low level during the remaining UIs of the one cycle.

BRIEF DESCRIPTION OF THE DRAWINGS

FIG. 4 is a diagram for describing a reception unit according to some example embodiments of the present invention.

FIG. 5 is a diagram for describing a mode according to a relationship between an adjacent reception signal of an adjacent channel and a reception signal of a target channel.

FIG. 6 is a diagram for describing crosstalk-induced jitter caused by an adjacent reception signal.

FIG. 7 is a diagram for describing another example of crosstalk-induced jitter caused by an adjacent reception signal.

DETAILED DESCRIPTION

Figure 1:
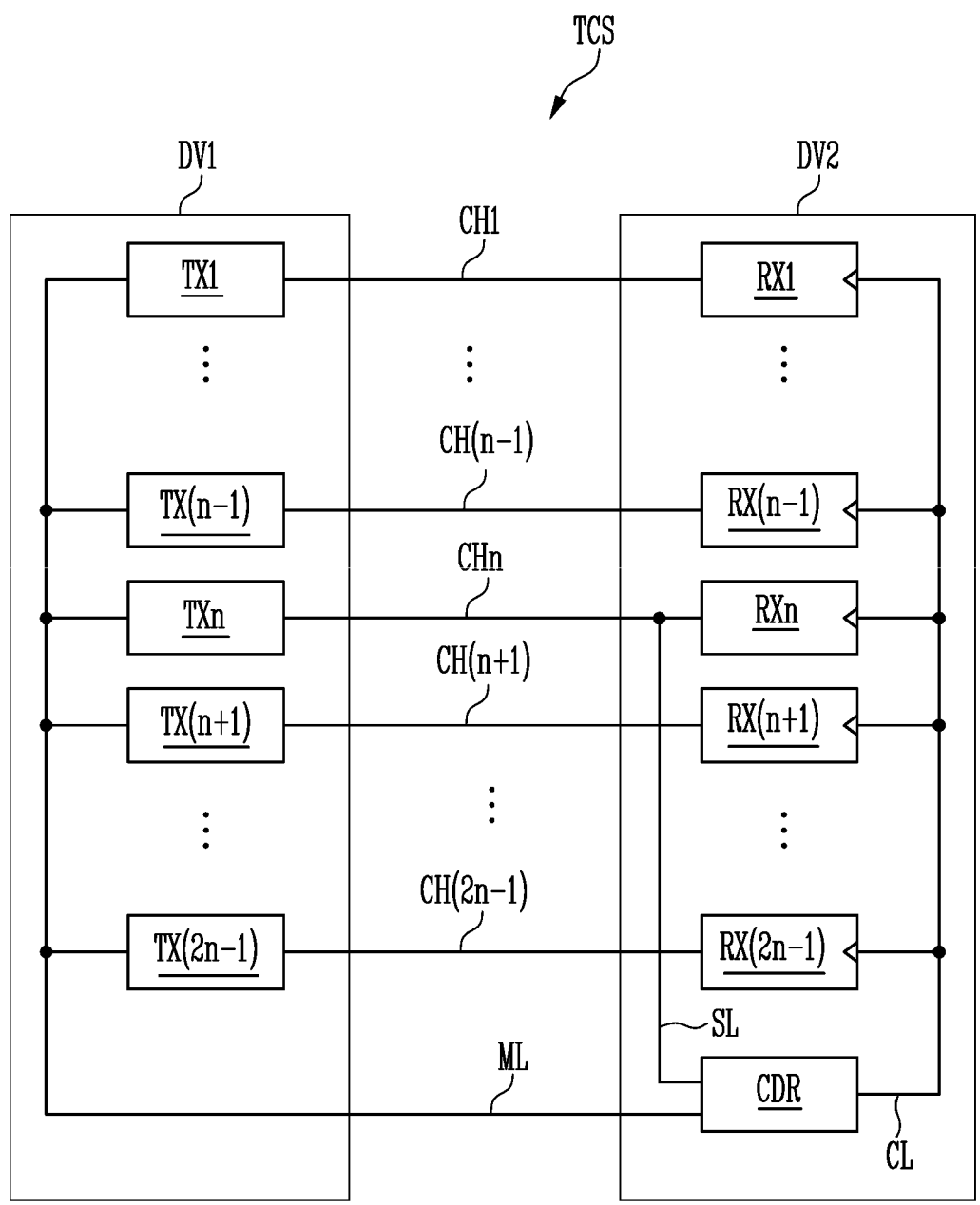
FIG. 1 is a diagram for describing a receiver and a transceiver including the same according to some example embodiments of the present invention.

Hereinafter, aspects of some example embodiments of the present invention will be described in more detail with reference to the accompanying drawings so as to be easily realized by those skilled in the art. The present invention may, however, he embodied in different forms and should not be constructed as limited to the example embodiments set forth herein.

In addition, parts irrelevant to description are omitted in the drawings in order to more clearly explain the present invention. The same reference numerals are allocated to the same or similar components throughout this specification. Therefore, previously described reference numerals may be used in other drawings Also, because sizes and thicknesses of components in drawings are arbitrarily shown for convenience of description, the sizes and thicknesses are not limited thereto. In the drawing of the present specification, thicknesses may be exaggerated in order to clearly show various layers and regions.

FIG. 1 is a diagram for describing a receiver and a transceiver including the same according to some example embodiments of the present invention.

Referring to FIG. 1, a transceiver TCS according to some example embodiments of the present invention includes a transmitter DV1 and a receiver DV2.

The transmitter DV1 includes transmission units TX1 to TX(2n−1) connected to channels CH1 to CH(2n−1) corresponding thereto.

The receiver DV2 includes reception units RX1 to RX(2n−1) connected to the channels CH1 to CH(2n−1) corresponding thereto.

In addition, the receiver DV2 includes a clock data recovery unit CDR. The clock data recovery unit CDR may be connected to a sensing channel CHn of the channels CH1 to CH(2n−1) through a sensing line SL and may be connected to the reception units RX1 to RX(2n−1) through a clock line CL. According to some example embodiments, clock data recovery unit CDR may be connected to the transmission units TX1 to TX(2n−1) through a mode line ML.

The transceiver TCS may be operated in one of a training mode and a normal mode. The training mode is a mode in which the clock data recovery unit CDR generates sampling clock signals, and the normal mode is a mode in which data signals are sampled using the generated sampling clock signals. During the training mode, training pattern signals may transmitted through the channels CH1 to CH(2n−1), and during the normal mode, the data signals may be transmitted through the channels CH1 to CH(2n−1).

First, the training mode will be described.

According to some example embodiments, the reception units RX1 to RX(2n−1) may receive training pattern signals having the same transition direction through the channels CH1 to CH(2n−1) in the training mode.

In this case, the clock data recovery unit CDR may generate a sampling clock signal of which a phase is adjusted such that a transition time point of a training pattern signal of the sensing channel CHn corresponds to a sampling time point in the training mode. According to some example embodiments, when the sampling clock signal is generated, the clock data recovery unit CDR may provide mode signals corresponding to the normal mode through the mode line ML.

According to some example embodiments, the reception units RX1 to RX(2n−1) may receive first training pattern signals having the same first transition direction and second training pattern signals having the same second transition direction through the channels CH1 to CH(2n−1) in the training mode. In this case, the first transition direction and the second transition direction may be different.

Here, in the training mode, the clock data recovery unit CDR may generate a sampling clock signal so as to correspond to a more delayed phase of a first sampling time point corresponding to a first transition time point of the first training pattern signal of the sensing channel and a second sampling time point corresponding to a second transition time point of the second training pattern signal.

Hereinafter, the normal mode will be described.

When the transmission units TX1 to TX(2n−1) receive mode signals corresponding to the normal mode, the transmission units TX1 to TX(2n−1) may provide data signals through the corresponding channels CH1 to CH(2n−1).

In the normal mode, the clock data recovery unit CDR may provide sampling clock signals to the reception units RX1 to RX(2n−1) through the clock line CL.

In the normal mode, the reception units RX1 to RX(2n−1) may sample the data signals received through the corresponding channels CH1 to CH(2n−1) using the sampling clock signals.

According to some example embodiments, a clock data recovery unit is not required in each of a plurality of channels CH1 to CH(2n−1), and only one clock data recovery unit CDR is required in the sensing channel CHn, thereby reducing a required chip area and reducing power consumption.

It will be described below with reference to FIGS. 11 to 14 that there is no problem in data sampling even when sampling clock signals with respect to the plurality of channels CH1 to CH(2n−1) are generated based on one sensing channel CHn.

In this case, it is important to determine the sensing channel CHn of the plurality of channels CH1 to CH(2n−1). According to some example embodiments, the sensing channel CHn may be a channel of the channels CH1 to CH(2n−1), which receives a reception signal having the most delayed phase among the same transmission signals. According to some example embodiments, the sensing channel CHn may be a channel which is positioned in a middle among the channels CH1 to CH(2n−1).

Here, n may be a natural number of two or more. However, although the last channel CH(2n−1) in FIG. 1 is shown as being a $(2n-1)^{th}$ channel, that is, an odd numbered channel, the present example embodiment may be applied even when the last channel is an even numbered channel. For example, the last channel may be a $2n^{th}$ channel. For example, when the sensing channel CHn is a fourth channel, the last channel may be an eighth channel. In addition, when the last channel is an eighth channel, the sensing channel may be a fifth channel.

That is, when the sensing channel CHn of the present example embodiment is determined, it is not important that what number the channel is the sensing channel CHn is a channel, but it is important to determine a channel of the channels CH1 to CH(2n−1), which receives a reception signal having the most delayed phase among the same transmission signals, as the sensing channel CH.

When the channels CH1 to CH(2n−1) have a physical structure in which the channels CH1 to CH(2n−1) are simply arranged in a plan view, the sensing channel CHn may be a channel which is positioned in a middle among the channels CH1 to CH(2n−1). However, when the channels CH1 to CH(2n−1) are provided to have a three-dimensional structure (for example, when a plurality of channels are present as a bundle inside a wiring sheath), a manufacturer may identify a channel which receives a reception signal having the most delayed phase through a method of transmitting sample training signals in advance and may determine the channel as the sensing channel CHn. That is, the sensing channel CHn may be determined differently for each product.

In addition, according to some example embodiments, it will be described below with reference to FIGS. 6 to 14 that crosstalk-induced jitter may be effectively solved, and it will be described below with reference to FIGS. 17 to 22 that inter-symbol interference may be effectively solved.

Figure 2:
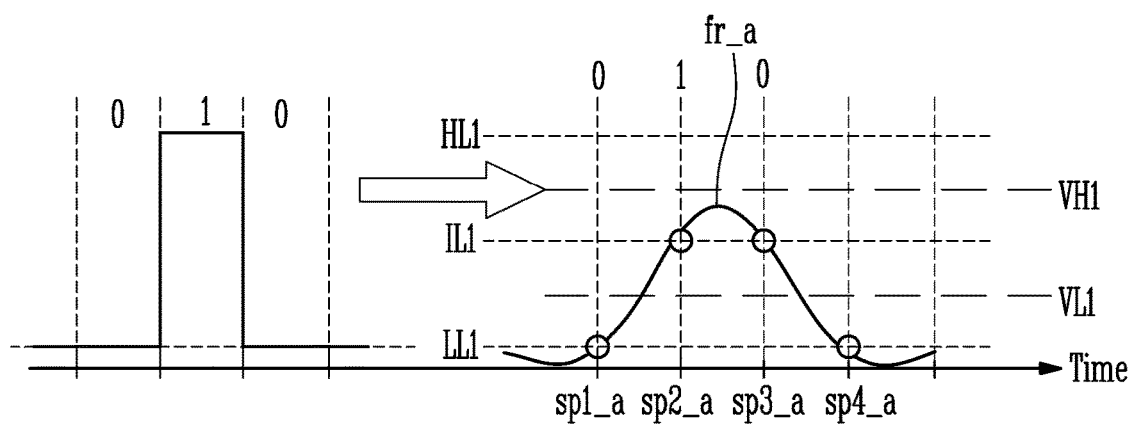
FIG. 2 is a diagram for describing a reception signal with respect to one transmission signal.
Figure 3:
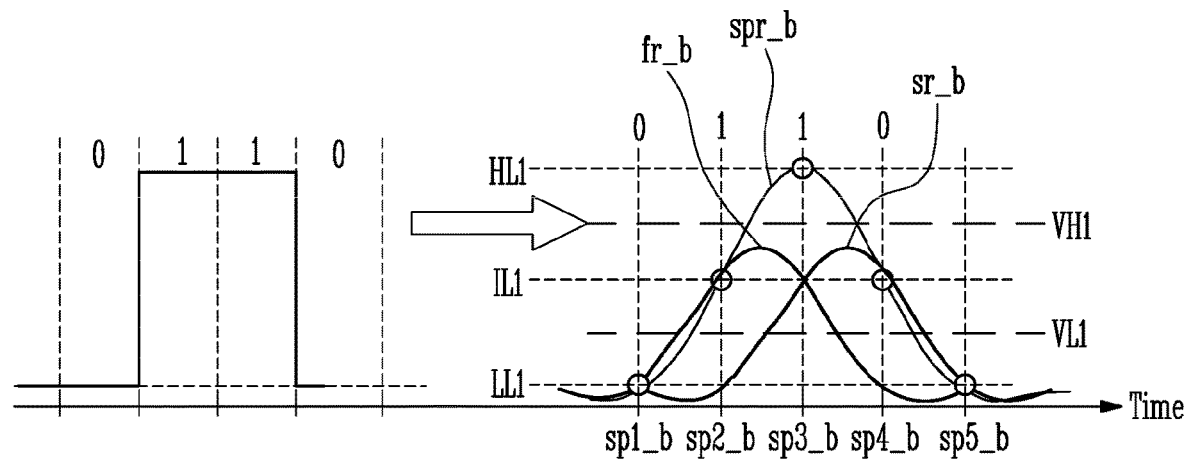
FIG. 3 is a diagram for describing a reception signal with respect to another transmission signal.

FIG. 2 is a diagram for describing a reception signal with respect to one transmission signal, and FIG. 3 is a diagram for describing a reception signal with respect to another transmission signal.

It is assumed that there is no crosstalk-induced jitter in FIGS. 2 and 3. In FIGS. 2 and 3, an interval between adjacent sampling time points is one unit interval (UI).

Figure 17:
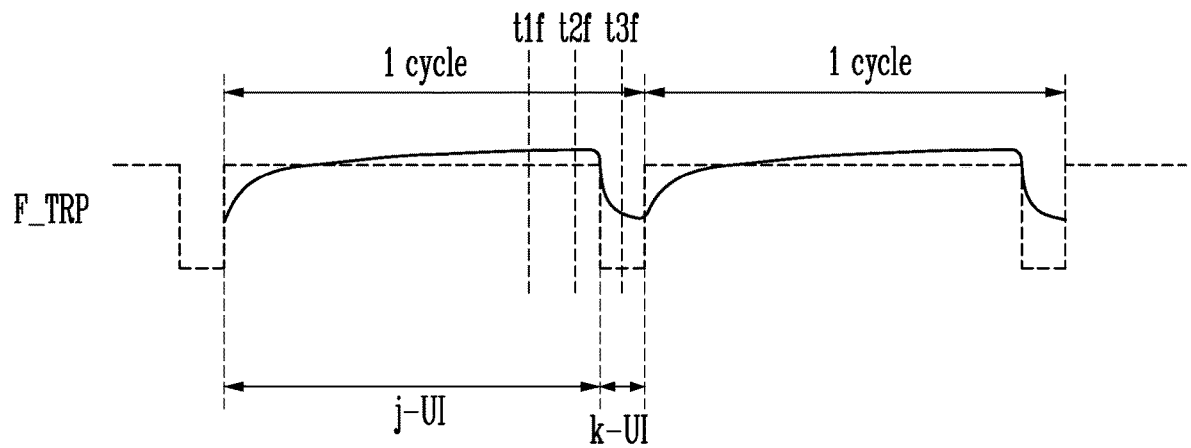
FIG. 17 is a diagram for describing an example first training pattern signal usable in the transition detector of FIG. 16.
Figure 22:
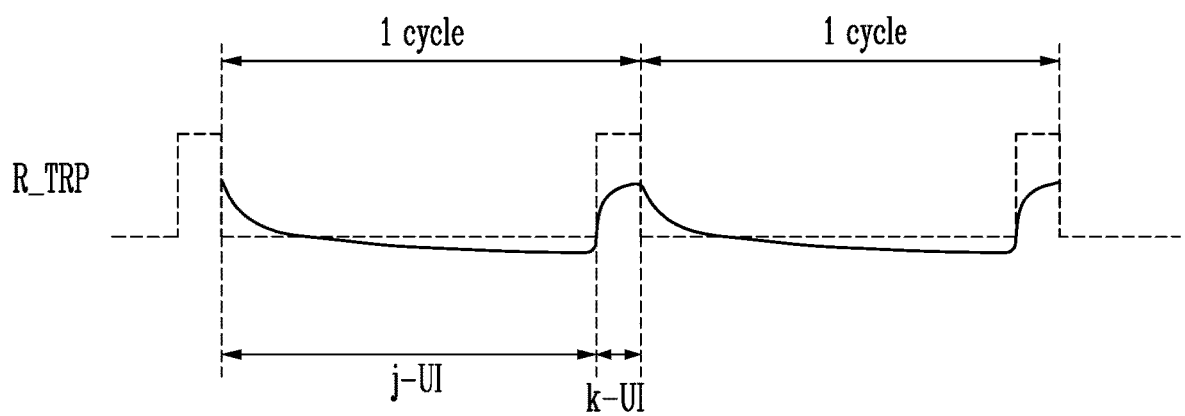
FIG. 22 is a diagram for describing an example second training pattern signal usable in the transition detector of FIG. 21.

FIGS. 2 and 3, a variable level of the reception signal may be one in a range of the lowest level LL1 to the highest level HL1. There is an intermediate level IL1 between the lowest level LL1 and the highest level HL1. In this case, it is assumed that a channel through which the reception signal passes is ideal. The descriptions related to FIGS. 17 and 22 are referenced for a difference between an ideal channel and an actual channel.

Referring to FIG. 2, when the transmitter DV1 transmits a transmission signal having a binary level of 0 1 0 through any one channel, a reception signal fr_a of the receiver DV2, which passes through the channel, is shown as an example. It is assumed that the remaining data of the transmission signal not shown in FIG. 2 has a binary level of 0.

A form of the reception signal fr_a as shown in FIG. 2 may be acquired when the channel is designed as a low pass filter. Accordingly, according to some example embodiments, the plurality of channels CH1 to CH(2n−1) connecting the transmitter DV1 and the receiver DV2 may each be designed as a low pass filter.

The reception signal according to a response form as shown in FIG. 2 may be referred to as a duo-binary signal. In addition to when the channel is designed as the low pass filter, the response form as shown in FIG. 2 may also appear when the transmitter DV1 is equipped with an encoder for duo-binary signaling.

Although there are various duo-binary signaling methods, in the case of the reception signal fr_a of FIG. 2, in general, a cursor at a sampling time point sp1_a is a pre-cursor, a cursor at a sampling time point sp2_a is a main cursor, a cursor at a sampling time point sp3_a is a first post-cursor, and a cursor at a sampling time point sp4_a is a second post-cursor. For an appropriate application of duo-binary signaling, various known methods may be used such that levels (sizes) of the main cursor and the first post-cursor are the same.

Referring to FIG. 3, when the transmitter DV1 transmits a transmission signal having a binary level of 0 1 1 0 through any one channel, a reception signal spr_b of the receiver DV2, which passes through the channel, is shown as an example. It is assumed that the remaining data of the transmission signal not shown in FIG. 3 has a binary level of 0.

In FIG. 3, the reception signal spr_b may be regarded as a superimposed signal of a response signal fr_b corresponding to a first binary level of 1 and a response signal sr_b corresponding to a second binary level of 1. In the case of the response signal fr_b, in general, a cursor at a sampling time point sy1_b is a pre-cursor, a cursor at a sampling time point sp2_b is a main cursor, a cursor at a sampling time point sp3_b is a first post-cursor, and a cursor at a sampling time point sp4_b is a second post-cursor. In the case of the response signal sr_b, in general, a cursor at the sampling time point sp2_b is a pre-cursor, a cursor at the sampling time point sp3_b is a main cursor, a cursor at the sampling time point sp4_b is a first post-cursor, and a cursor at a sampling time point sp5_b is a second post-cursor.

Hereinafter, a decoding method of a duo-binary signal will be described with reference to FIGS. 2 and 3.

When decoding is performed on a duo-binary signal, a determination value of data before one UI may be required. When the determination value of the data before one UI is 1, a first reference voltage VH1 may be used in determining current data. In addition, when the determination value of the data before one UI is 0, a second reference voltage VL2 may be used in determining current data. The first reference voltage VH1 may have an intermediate value between the highest level HL1 and the intermediate level IL1 among the variable levels of the reception signal. The second reference voltage VL1 may have an intermediate value between the highest level HL1 and the intermediate level IL1 among the variable levels of the reception signal.

For example, referring to FIG. 2, at the sampling time point sp2_a, because a determination value of data before one UI is 0, a binary level of current data may be determined based on the second reference voltage VL1. Because a level of the reception signal sampled at the sampling time point sp2_a is the intermediate level IL1, which is higher than that of the second reference voltage VL1, a binary level thereof may be determined as 1.

Next, referring to FIG. 2, at the sampling time point sp3_a, because a determination value of data before one UI is 1, a binary level of current data may be determined based on the first reference voltage VH1. Because a level of the reception signal sampled at the sampling time point sp3_a is the intermediate level IL1, which is lower than that of the first reference voltage VH1, a binary level thereof may be determined as 0.

For another example, referring to FIG. 3, at the sampling time point sp2_b, because a determination value of data before one UI is 0, a binary level of current data may be determined based on the second reference voltage VL1. Because a level of the reception signal sampled at the sampling time point sp2_a is the intermediate level IL1, which is higher than that of the second reference voltage VL1, a binary level thereof may be determined as 1.

Next, referring to FIG. 3, at the sampling time point sp3_b, because a determination value of data before one UI is 1, a binary level of current data may be determined based on the first reference voltage VH1. Because a level of the reception signal sampled at the sampling time point sp3_b is the highest level HL1, which is higher than that of the first reference voltage VH1, a binary level thereof may be determined as 1.

Next, referring to FIG. 3, at the sampling time point sp4_b, because a determination value of data before one UI is 1, a binary level of current data may be determined based on the first reference voltage VH1. Because a level of the reception signal sampled at the sampling time point sp4_b is the intermediate level IL1, which is lower than that of the first reference voltage VH1, a binary level thereof may be determined as 0.

A reception unit RXi according to FIG. 4 embodies the above-described determining method according to some example embodiments.

FIG. 4 is a diagram for describing the reception unit according to some example embodiments of the present invention.

In FIG. 4, although the reception unit RXi is shown based on an $i^{th}$ channel CHi, the same contents may be applied to other channels and reception units. i may be a natural number. When the $i^{th}$ channel CHi is a sensing channel CHn, the reception unit RXi may be further connected to a sensing line SL.

Referring to FIG. 4, the reception unit RXi may include a first comparator CMP1, a second comparator CMP2, and a multiplexer MUX.

The first comparator CMP1 may compare a reception signal with a first reference voltage VH1 according to a sampling clock signal supplied through a clock line CL to provide a logic value. The reception signal may be received through the channel CHi. The first comparator CMP1 may be operated according to a rising transition or a falling transition of the sampling clock signal to sample a magnitude of the reception signal at a sampling time point thereof and compare the reception signal with the first reference voltage VH1. According to some example embodiments, the first comparator CMP1 may compare the reception signal with the first reference voltage VH1 using a magnitude of the reception signal integrated in a high level period or a low level period of the sampling clock signal. When the reception signal is greater than the first reference voltage VH1, the first comparator CMP1 may provide a high level logic value. When the reception signal is less than the first reference voltage VH1, the first comparator CMP1 may provide a low level logic value.

The second comparator CMP2 may compare a reception signal with a second reference voltage VL1 according to the sampling clock signal to provide a logic value. The reception signal may be received through the channel CHi. The second comparator CMP2 may be operated according to a rising transition or a falling transition of the sampling clock signal to sample a magnitude of the reception signal at a sampling time point thereof and compare the reception signal with the second reference voltage VL1. According to some example embodiments, the second comparator CMP2 may compare the reception signal with the second reference voltage VL1 using a magnitude of the reception signal integrated in a high level period or a low level period of the sampling clock signal. When the reception signal is greater than the second reference voltage VL1, the second comparator CMP2 may provide a high level logic value. When the reception signal is less than the second reference voltage VL1, the second comparator CMP2 may provide a low level logic value.

The multiplexer MUX may output one of output values of the first comparator CMP1 and the second comparator CMP2 as current data D[m]. The multiplexer may select one of the output values of the first comparator CMP1 and the second comparator CMP2 based on previous data D[m−1] before one UI and output the selected one as the current data D[m]. Specifically, when the previous data D[m−1] has a binary level of 1, the multiplexer MUX may output the output value of the first comparator CMP1 as the current data D[m]. On the other hand, when the previous data D[m−1] has a binary level of 0, the multiplexer MUX may output the output value of the second comparator CMP2 as the current data D[m]. When an output value of the multiplexer MUX is a high level logic value, the current data D[m] may have a binary level of 1, and when the output value of the multiplexer MUX is a low level logic value, the current data D[m]) may have a binary level of 0

FIG. 5 is a diagram for describing a mode according to a relationship between an adjacent reception signal of an adjacent channel and a reception signal of a target channel.

In describing crosstalk-induced jitter, the target channel is referred to as a victim channel, and the adjacent channel is referred to as an aggressor channel that exerts an adverse influence on the victim channel. In the present description, the target channel that is the victim channel is assumed to be a channel CH2, and the aggressor channel is assumed to be a channel CH1.

Meanwhile, crosstalk-induced jitter induced from the channel CH2 may exert an adverse influence on the channel CH1, and the adverse influence may return to the channel CH2 again. However, in this case, because the influence is relatively small and descriptions thereof are excessively complicated, the descriptions thereof are omitted.

A case in which transition directions of the victim channel CH2 and the aggressor channel CH1 are different is referred to as an odd mode. There may be two cases as shown in FIG. 5.

A case in which transition directions of the victim channel CH2 and the aggressor channel CH1 are the same is referred to as an even mode. There may be two cases as shown in FIG. 5.

On the other hand, a case in which there is no transition in channel is referred to as a static mode. In FIG. 5, there is no transition in the aggressor channel CH1 regardless of transition directions of the victim channel CH2. In this case, there may be two cases as shown in FIG. 5.

FIG. 6 is a diagram for describing crosstalk-induced jitter caused by an adjacent reception signal, and FIG. 7 is a diagram for describing another example of crosstalk-induced jitter caused by an adjacent reception signal.

Referring to FIG. 6, FIG. 6 shows a case of an even mode in which both the victim channel CH2 and the aggressor channel CH1 transition to rise.

When a rising transition occurs in the aggressor channel CH1, a voltage drop occurs in to the victim channel CH2 in a downward direction opposite to a direction of the rising transition by mutual inductance between the two channels CH1 and CH2.

Therefore, a certain time is required for a voltage of the victim channel CH2 to rise again, and a delay occurring in such a manner becomes crosstalk-induced jitter in an even mode.

Referring to FIG. 7, FIG. 7 shows a case of an even mode in which both the victim channel CH2 and the aggressor channel CH1 transition to fall When a falling transition occurs in the aggressor channel CH1, a voltage rise occurs in the victim channel CH2 in an upward direction opposite to a direction of the falling transition due to mutual inductance between the two channels CH1 and CH2.

Therefore, a certain time is further required for a voltage of the victim channel CH2 to fall again, and a delay occurring in such a manner becomes crosstalk-induced jitter in an even mode.

As a result, in the even mode, crosstalk-induced jitter occurs in which a reception signal of the victim channel CH2 is delayed regardless of a transition direction thereof.

In the case of the odd mode, crosstalk-induced jitter may occur in a direction opposite to a direction of the crosstalk-induced jitter of the even mode, and descriptions thereof are omitted. For reference, crosstalk-induced jitter may not occur in a static mode.

Figure 8:
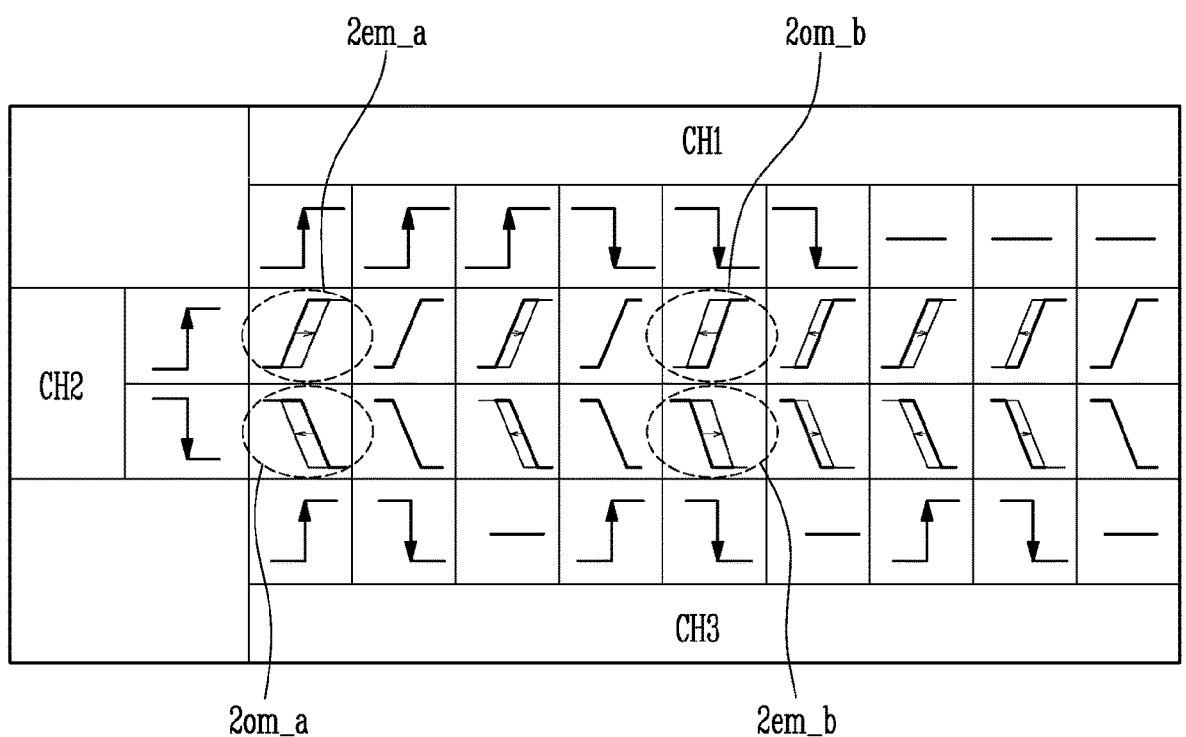
FIG. 8 is a diagram for describing crosstalk-induced jitter according to a relationship between adjacent reception signals of two adjacent channels and a reception signal of a target channel.

FIG. 8 is a diagram for describing crosstalk-induced jitter according to a relationship between adjacent reception signals of two adjacent channels and a reception signal of a target channel.

In the present description, a target channel that is a victim channel is assumed to be a channel CH2, and aggressor channels are assumed to be channels CH1 and CH3.

Meanwhile, crosstalk-induced jitter induced from the channel CH2 may exert an adverse influence on the channels CH1 and CH3, and the adverse influence may return to the channel CH2 again. However, in this case, because the influence is relatively small and descriptions thereof are excessively complicated, the descriptions thereof are omitted.

A case in which transition directions of the victim channel CH2 and the two adjacent aggressor channels CH1 and CH3 are the same is referred to as a 2-even mode. As shown in FIG. 8, there may be a case in which signals of the channels CH1, CH2, and CH3 all have a rising transition 2em_a and a case in which the signals of the channels CH1, CH2, and CH3 all have a falling transition 2em_b.

Referring to FIG. 8, it may be confirmed that, when transitions occur in the two aggressor channels CH1 and CH3 in the same direction, the greatest crosstalk-induced jitter occur, when a transition occurs in only one aggressor channel, smaller crosstalk-Induction jitter occurs, and when transitions occurs in two aggressor channels CH1 and CH3 in opposite directions, the transitions are cancelled with each other and thus crosstalk-induced jitter does not occur.

A case in which transition directions of the two adjacent aggressor channels CH1 and CH3 are the same and are opposite to a transition direction of the victim channel CH2 is referred to as a 2-odd mode. Referring to FIG. 8, two cases 2om_a and 2om_b are shown. In this case, a direction of crosstalk-induced jitter is opposite to that of the 2-even mode.

A case in which no transition occurs in the two adjacent channels CH1 and CH3 is referred to as a static mode.

Figure 9:
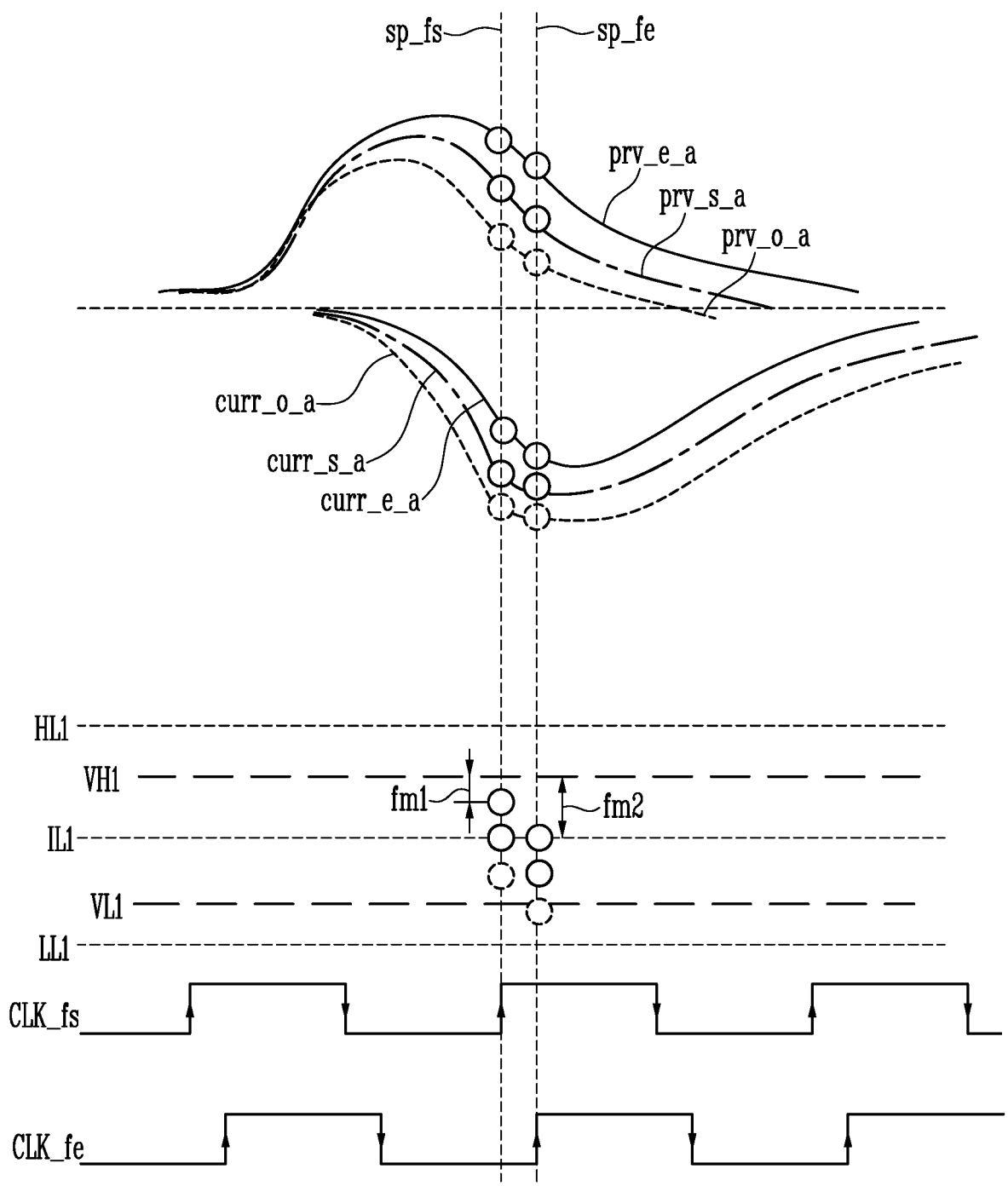
FIG. 9 shows diagrams for describing a reason for receiving first training pattern signals having the same first transition direction through channels in a training mode.

FIG. 9 shows diagrams for describing a reason for receiving first training pattern signals having the same first transition direction through channels in a training mode.

Hereinafter, a first transition direction may refer to a falling transition direction. In addition, a second transition direction may refer to a rising transition direction.

Referring to FIGS. 2 and 3 again to describe this, features of duo-binary signaling may be seen as follows. In both of a case of a rising transition in which a binary level transitions from 0 to 1 and a case of a falling transition in which a binary level transitions from 1 to 0, a level of a sampled reception signal becomes an intermediate level IL1.

For example, referring to the transmission signal of FIG. 2, a binary level transitions to rise from 0 to 1 and immediately transitions to fall from 1 to 0. In this case, referring to the reception signal fr_a of FIG. 2, levels of the reception signal sampled at the sampling time points sp2_a and sp3_a corresponding to transitions are all the intermediate level IL1.

In addition, for example, referring to the transmission signal of FIG. 3, a binary level transitions to rise from 0 to 1, remains at 1 for one UI, and then transitions to fall to 0. In this case, referring to the reception signal fr_b of FIG. 3, levels of the reception signal sampled at the sampling time points sp2_b and sp4_b corresponding to transitions are all the intermediate level IL1

According to some example embodiments, crosstalk-induced jitter may be compensated for based on the features of the duo-binary signaling.

Referring to FIG. 9 again, FIG. 9 conceptually shows a case in which a previous signal before one UI has a binary level of 1 and a current signal has a binary level of 0. That is, a falling transition is shown. Signals shown in FIG. 9 are not actual signals, and to facilitate understanding, a response to each binary data is conceptually separated and exaggerated. For example, a sampling time point sp_fs of FIG. 9 may correspond to the sampling time point sp3_a of FIG. 2, and a superimposed signal of a previous signal prv_s_a and a current signal curr_s_a of FIG. 9 may be the reception signal fr_a at the sampling time point sp3_a of FIG. 2.

Previous signals prv_o_a, prv_s_a, and prv_e_a of FIG. 9 are single bit responses with respect to a binary level of 1 in an odd mode, a static mode, and an even mode, respectively, and in order to clearly show the signals, before-and-after pieces of binary data are assumed to have a level of 0.

Current signals curr_o_a, curr_s_a, and curr_e_a of FIG. 9 are single-bit responses with respect to a binary level of 0 in an odd mode, a static mode, and an even mode, respectively, and in order to clearly show the signals, before-and-after pieces binary data are assumed to have a level of 1.

The sampling time point sp_fs is a sampling time point of a sampling clock signal CLK_fs of which a phase is adjusted based on the static mode, and a sampling time point sp_fe is a sampling time point of a sampling clock signal CLK_fe of which a phase is adjusted based on the even mode.

When reception signals are in the static mode and are sampled at the sampling time point sp_fs using the sampling clock signal CLK_fs, the sum level of a first post cursor of the previous signal prv_s_a before one UI and a main cursor of the current signal curr_s_a is an intermediate level IL1. Because the previous signal prv_s_a has a binary level of 1, a first reference voltage VH1 is used in determining the current signal curr_s_a. Because the sum level of the first post cursor of the previous signal prv_s_a before one UI and the main cursor of the current signal curr_s_a is the intermediate level IL1 which is lower than that of the first reference voltage VH1, a binary level of the current signal curr_s_a may be determined as 0.

On the other hand, when reception signals are in the even mode and are sampled at the sampling time point sp_fs using the sampling clock signal CLK_fs, the sum level of a first post cursor of the previous signal prv_e_a before one UI and a main cursor of the current signal curr_e_a is higher than the intermediate level IL1. Because the previous signal prv_e_a has a binary level of 1, the first reference voltage VH1 is used in determining the current signal curr_e_a. Because the sum level of the first post cursor of the previous signal prv_e_a before one UI and the main cursor of the current signal curr_e_a is lower than a level of the first reference voltage VH1, a binary level of the current signal curr_e_a is determined as 0, but there is a problem in that a margin fm1 is too small. According to a communication environment, when the sum level of the first post cursor of the previous signal prv_e_a before one UI and the main cursor of the current signal curr_e_a exceeds the level of the first reference voltage VH1, an error occurs in decoding.

When reception signals are in the odd mode and are sampled at the sampling time point sp_fs using the sampling clock signal CLK_fs, the sum level of a first post cursor of the previous signal prv_o_a before one UI and a main cursor of the current signal curr_o_a is lower than the intermediate level IL1. Because the previous signal prv_o_a has a binary level of 1, the first reference voltage VH1 is used in determining the current signal curr_o_a. Because the sum level of a first post cursor of the previous signal prv_o_a before one UI and a main cursor of the current signal curr_o_a is sufficiently lower than a level of the first reference voltage VH1, there is no problem in determining a binary level of the current signal curr_o_a as 0. In this case, rather, a margin is greater than that of the static mode.

As described above, in the case of the falling transition, the worst case on which compensation is to be performed is the case of the even mode.

According to some example embodiments, in the training mode, the "first training pattern signals having the same first transition direction", that is, the "first training pattern signals having a falling transition direction of the even mode" may be received through the channels CH1 to CH(2n−1).

According to some example embodiments, it may be possible to generate the sampling clock signal CLK_fe of which the phase is adjusted such that a transition time point of the first training pattern signal corresponds to the sampling time point sp_fe. It can be confirmed that the even mode has a sufficient margin fm2 at the sampling time point sp_fe at which a phase is adjusted. Because the static mode and the odd mode have a greater margin, there is no problem. Accordingly, in accordance with the sampling clock signal CLK_fe, a probability of a decoding error caused by crosstalk-induced jitter is reduced in all modes.

Figure 10:
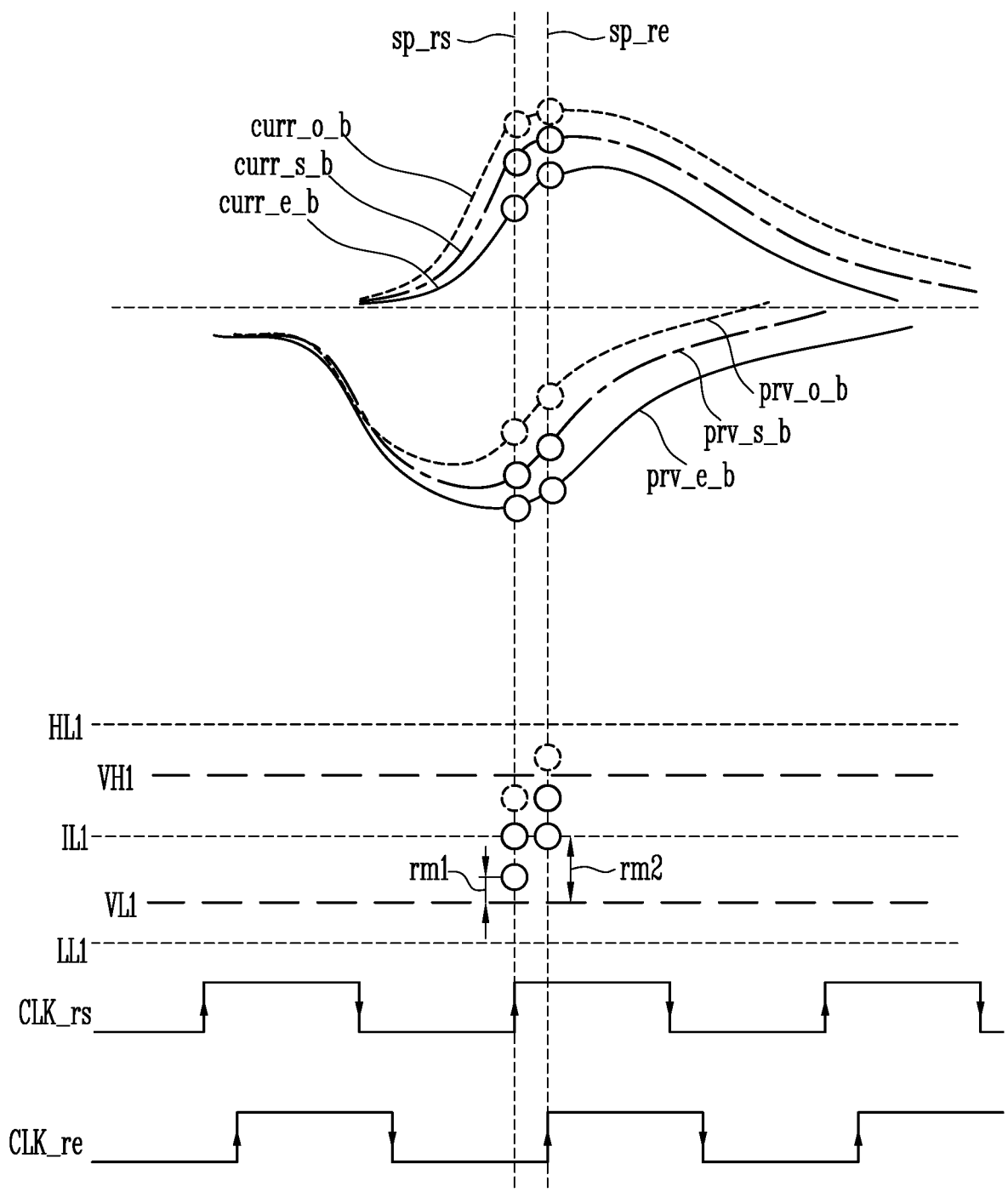
FIG. 10 shows diagrams for describing a reason for receiving second training pattern signals having the same second transition direction through channels in a training mode.

FIG. 10 shows diagrams for describing a reason for receiving second training pattern signals having the same second transition direction through channels in a training mode.

Referring to FIG. 10, FIG. 10 conceptually shows a case in which a signal before one UI has a binary level of 0 and a current signal has a binary level of 1. That is, a rising transition is shown. Signals shown in FIG. 9 are not actual signals, and to facilitate understanding, a response to each binary data is conceptually separated and exaggerated. For example, a sampling time point sp_rs of FIG. 10 may correspond to the sampling time point sp2_a of FIG. 2, and a superimposed signal of a previous signal prv_s_b and a current signal curr_s_b of FIG. 10 may be the reception signal fr_a at the sampling time point sp2_a of FIG. 2.

Previous signals prv_o_b, prv_s_b, and prv_e_b of FIG. 10 are single bit responses with respect to a binary level of 0 in an odd mode, a static mode, and an even mode, respectively, and in order to clearly show the signals, before-and-after pieces of binary data are assumed to have a level of 1.

Current signals curr_o_b, curr_s_b, and curr_e_b of FIG. 10 are single bit responses with respect to a binary level of 1 in an odd mode, a static mode, and an even mode, respectively, and in order to clearly show the signals, before-and-after pieces of binary data are assumed to have a level of 0.

The sampling time point sp_rs is a sampling time point of a sampling clock signal CLK_rs of which a phase is adjusted based on the static mode, and a sampling time point sp_re is a sampling time point of a sampling clock signal CLK_re of which a phase is adjusted based on the even mode When reception signals are in the static mode and are sampled at the sampling time point sp_rs using the sampling clock signal CLK_rs, the sum level of a first post cursor of the previous signal prv_s_b before one UI and a main cursor of the current signal curr_s_b is an intermediate level IL1. Because the previous signal prv_s_b has a binary level of 0, a second reference voltage VL1 is used in determining the current signal curr_s_b. Because the sum level of the first post cursor of the previous signal prv_s_b before one UI and the main cursor of the current signal curr_s_b is the intermediate level IL1 which is higher than a level of the second reference voltage VL1, a binary level of the current signal curr_s_b may be determined as 1.

On the other hand, when receptions signals are in the even mode and are sampled at the sampling time point sp_rs using the sampling clock signal CLK_rs, the sum level of a first post cursor of the previous signal prv_e_b before one UI and a main cursor of the current signal curr_e_b is lower that the intermediate level IL1. Because the previous signal prv_e_b has a binary level of 0, the second reference voltage VL1 is used in determining the current signal curr_e_b. Because the sum level of the first post cursor of the previous signal prv_e_b before one UI and the main cursor of the current signal curr_e_b is higher than a level of the second reference voltage VL1, a binary level of the current signal curr_e_b is determined as 1, but there is a problem in that a margin rm1 is too small. According to a communication environment, when the sum level of the first post cursor of the previous signal prv_e_b before one UI and the main cursor of the current signal curr_e_b is lower than the level of the second reference voltage VL1, an error occurs in decoding.

When reception signals are in the odd mode and are sampled at the sampling time point sp_rs using the sampling clock signal CLK_fs, the sum level of a first post cursor of the previous signal prv_o_b before one UI and a main cursor of the current signal curr_o_b is higher than the intermediate level IL1. Because the previous signal prv_o_b has a binary level of 0, the second reference voltage VL1 is used in determining the current signal curr_o_b. Because the sum level of the first post cursor of the previous signal prv_o_b before one UI and the main cursor of the current signal curr_o_b is sufficiently higher than a level of the second reference voltage VL1, there is no problem in determining a binary level of the current signal curr_o_b as 1. In this case, rather, a margin is greater than that of the static mode.

As described above, even in the case of the rising transition, the worst case on which compensation is to be performed is the case of the even mode.

According to some example embodiments, in the training mode, the "second training pattern signals having the same second transition direction", that is, the "second training pattern signals having a rising transition direction of the even mode" may be received through the channels CH1 to CH(2n−1).

According to some example embodiments, it may be possible to generate the sampling clock signal CLK_re of which a phase is adjusted such that a transition time point of the second training pattern signal correspond to the sampling time point sp_re. It can be confirmed that the even mode has a sufficient margin rm2 at the sampling time point sp_re at which a phase is adjusted. Because the static mode and the odd mode have a greater margin, there is no problem. Accordingly, in accordance with the sampling clock signal CLK_re, a probability of a decoding error caused by crosstalk-induced jitter is reduced in all modes.

In both of the falling transition of FIG. 9 and the rising transition of FIG. 10, phases of the sampling clock signals CLK_fe and CLK_re set based on the even mode are more delayed than phases of the sampling clock signals CLK_fs and CLK_rs set based on the static mode.

Accordingly, according to some example embodiments of the present invention, the margins fm2 and rm2 may be secured even when training is performed on only one of the first training pattern signal and the second training pattern signal in the training mode.

According to some example embodiments of the present invention, training may be performed on both the first training pattern signal and the second training pattern signal in the training mode. In this case, the clock data recovery unit CDR may generate a sampling clock signal so as to correspond to a more delayed phase of a first sampling time point sp_fe corresponding to a first transition time point of the first training pattern signal and a second sampling time point sp_re corresponding to a second transition time point of the second training pattern signal. In this case, in the case of a transition corresponding to a more advanced phase, because a margin is more secured from a corresponding reference voltage, there is no problem in solving a decoding error.

Although FIGS. 9 and 10 show that sampling is performed according to a rising transition of a sampling clock signal, sampling may be performed according to a falling transition of a sampling clock signal according to products. In addition, according to products, when current integral type sampling is applied, in order to secure an acquisition time, transition time points of the clock signals CLK_fs, CLK_fe, CLK_rs, and CLK_re may precede the sampling time points sp_fs, sp_fe, sp_rs, and sp_re. Hereinafter, for convenience of description, it will be described that sampling is performed in a rising transition of a sampling clock signal.

Figure 11:
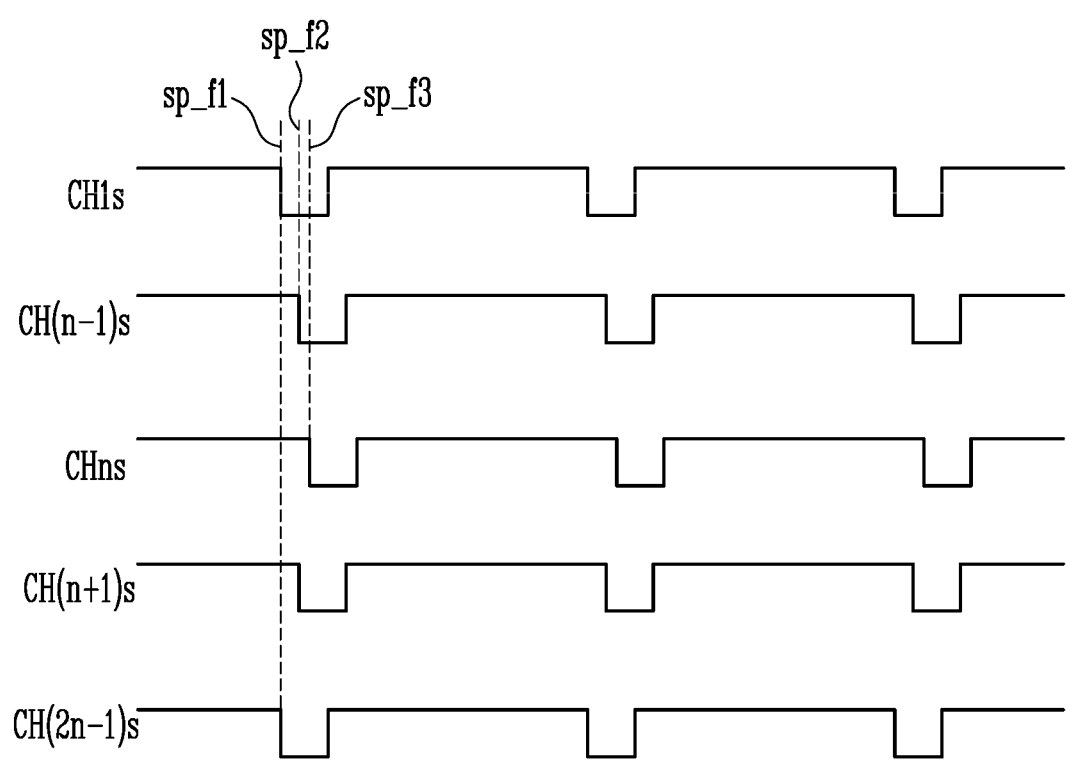
FIGS. 11 and 12 are diagrams for describing a reason for recovering a clock signal using a first training pattern signal of a sensing channel among first training pattern signals of channels.
Figure 12:
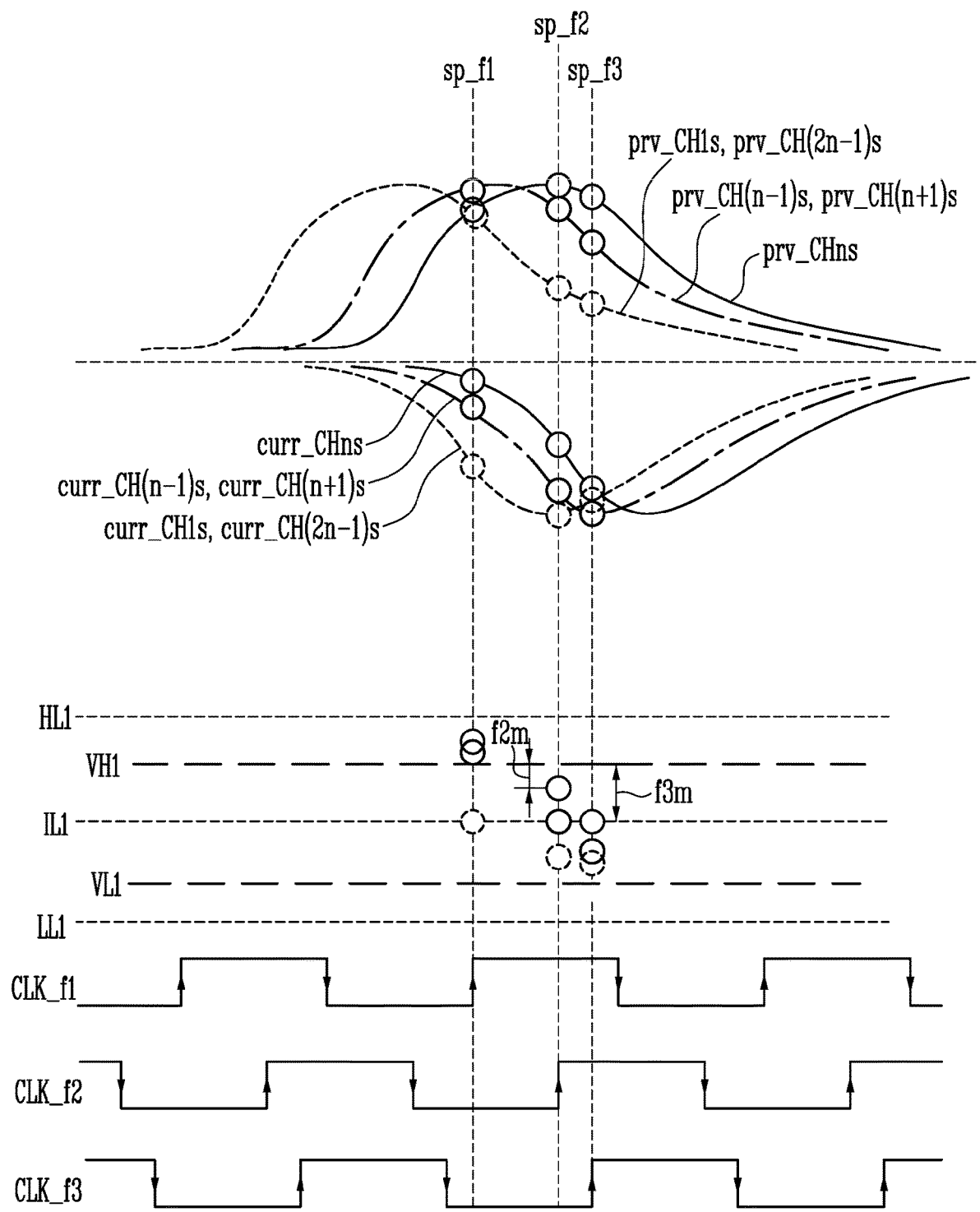

FIGS. 11 and 12 are diagrams for describing a reason for recovering a clock signal using a first training pattern signal of a sensing channel among first training pattern signals of channels.

Hereinafter, it is assumed that training pattern signals are provided in an even mode.

Even when the transmission units TX1 to TX(2n−1) transmit the same first training pattern signals, because the sensing channel CHn positioned in a middle is most influenced by crosstalk-induced jitter, a phase of a first training pattern signal CHns may be delayed most. A sampling clock signal CLK_f3 may be a signal of which a phase is adjusted such that a transition time point of the first training pattern signal CHns corresponds to a sampling time point sp_f3.

Phases of first training pattern signals CH(n−1)s and CH(n+1)s received through the channels CH(n−1) and CH(n+1) may be more delayed than phases of other first training pattern signals and may be more advanced than a phase of the first training pattern signal CHns. A sampling clock signal CLK_f2 may be a signal of which a phase is adjusted such that a transition time point of the first training pattern signals CH(n−1)s and CH(n+1)s corresponds to a sampling time point sp_f2.

Because channels CH1 and CH(2n−1) positioned at an outermost side are least influenced by crosstalk-induced jitter, phases of first training pattern signals CH1s and CH(2n−1)s received through the channels CH1 and CH(2n−1) may be more advanced than phases of the other first training pattern signals. A sampling clock signal CLK_f1 may be a signal of which a phase is adjusted such that a transition time point of the first training pattern signals CH1s and CH(2n−1)s corresponds to a sampling time point sp_f1.

When sampling is performed at the sampling time point sp_f1 using the sampling clock signal CLK_f1, the sum level of each of first post cursors of previous signals prv_CH1s and prv_CH(2n−1)s and each of main cursors of current signals curr_CH1s and curr_CH(2n−1)s of the channels CH1 and CH(2n−1) is an intermediate level IL1 and has a sufficient margin with a first reference voltage VH1. Thus, there is no problem in decoding a binary level as 0.

However, the sum level of each of first post cursors of previous signals prv_CH(n−1)s and prv_CH(n+1)s and each of main cursors of current signals curr_CH(n−1)s and curr_CH(n+1)s of the channels CH(n−1) and CH(n+1) and the sum level of a first post cursor of a previous signal prv_CHns and a main cursor of a current signal curr_CHns of the channel CHn each exceed a level of a first reference voltage VH1. Thus, a binary level is incorrectly decoded as 1, thereby resulting in an error.

When sampling is performed at the sampling time point sp_f2 using the sampling clock signal CLK_f2, the sum level of each of first post cursors of previous signals prv_CH(n−1)s and prv_CH(n+1)s and each of main cursors of current signals curr_CH(n−1)s and curr_CH(n+1)s of the channels CH(n−1) and CH(n+1) is the intermediate level IL1 and has a sufficient margin with the first reference voltage VH1. Thus, there is no problem in decoding a binary level as 0.

In addition, the sum level of each of the first post cursors of the previous signals prv_CH1s and prv_CH(2n−1)s and each of the main cursors of the current signals curr_CH1s and curr_CH(2n−1)s of the channels CH1 and CH(2n−1) is less than or equal to the intermediate level IL1 and has a sufficient margin with the first reference voltage VH1. Thus, there is no problem in decoding a binary level as 0.

However, the sum level of the first post cursor of the previous signal prv_CHns and the main cursor of the current signal curr_CHns of the channel CHn has an insufficient margin f2m with the first reference voltage VH1. Thus, there is a possibility in which a binary level is decoded as 1.

When sampling is performed at the sampling time point sp_f3 using the sampling clock signal CLK_f3, the sum level of the first post cursor of the previous signal prv_CHns and the main cursor of the current signal curr_CHns of the channel CHn is the intermediate level IL1 and has a sufficient margin with the first reference voltage VH1. Thus, there is no problem in decoding a binary level as 0. Other channels CH1, CH(n−1), CH(n+1), and CH(2n−1) have a greater margin with the first reference voltage VH1, and thus, there is no problem in decoding a binary level as 0.

Therefore, even when the sampling clock signal CLK_f3 is generated using the first training pattern signal of the sensing channel CHn that is most influenced by crosstalk-induced jitter, it can be confirmed that there is no problem in accurately sampling data signals of other channels CH1, CH(n−1), CH(n+1), and CH(2n−1).

Figure 13:
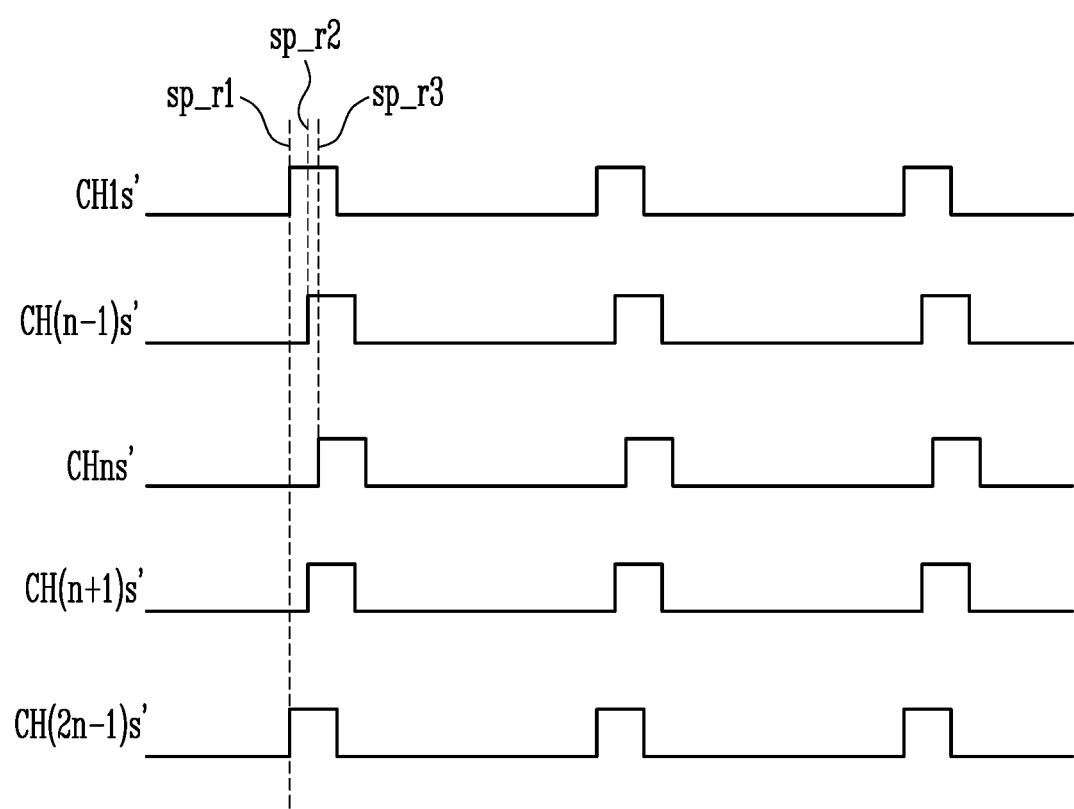
FIGS. 13 and 14 are diagrams for describing a reason for recovering a clock signal using a second training pattern signal of a sensing channel among second training pattern signals of channels.
Figure 14:
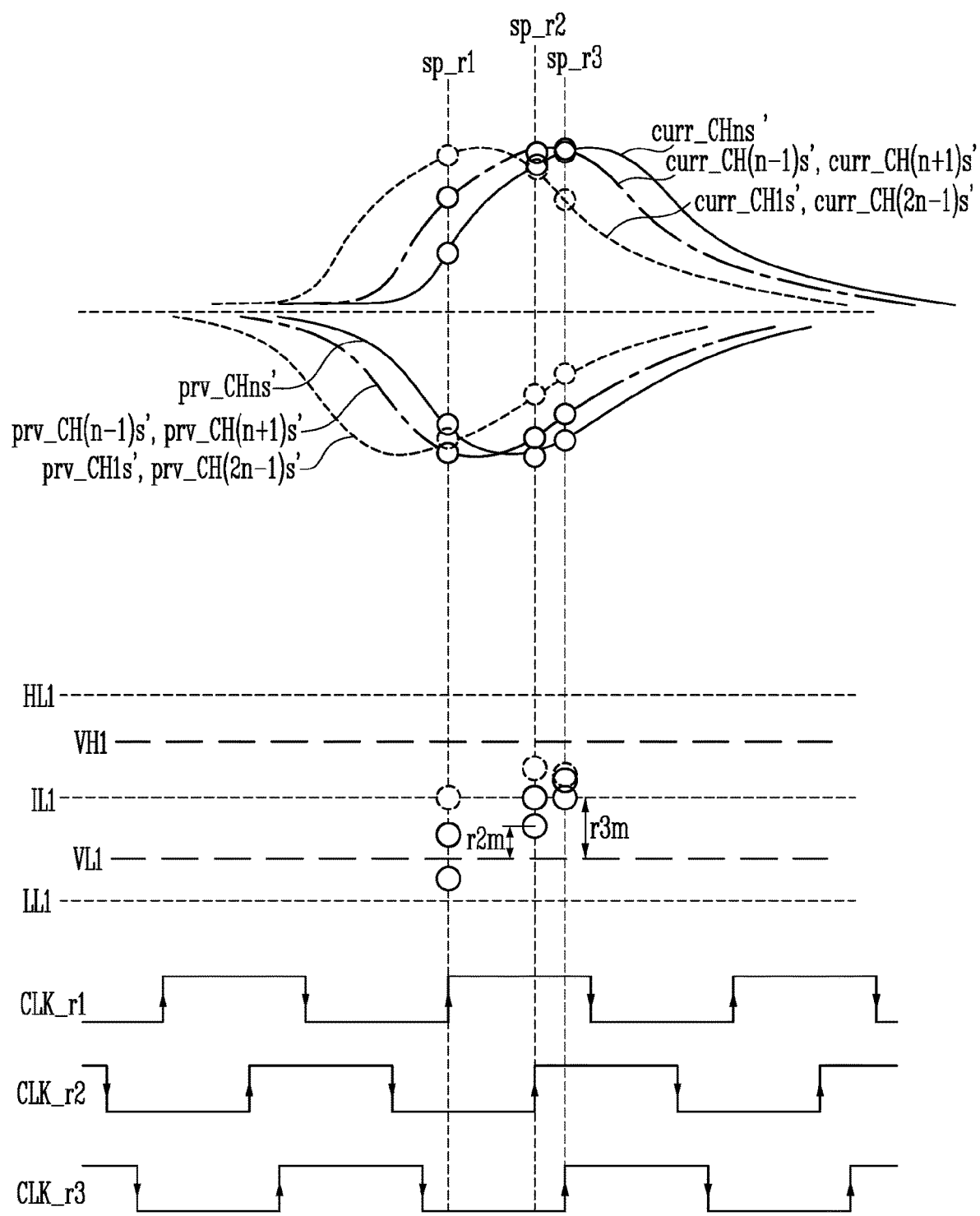

FIGS. 13 and 14 are diagrams for describing a reason for recovering a clock signal using a second training pattern signal of a sensing channel among second training pattern signals of channels.

Hereinafter, it is assumed that training pattern signals are provided in an even mode.

Even when the transmission units TX1 to TX(2n−1) transmit the same second training pattern signals, because the sensing channel CHn positioned in a middle is most influenced by crosstalk-induced jitter, a phase of a second training pattern signal CHns' may be delayed most. A sampling clock signal CLK_r3 may be a signal of which a phase is adjusted such that a transition time point of the second training pattern signal CHns' corresponds to a sampling time point sp_r3.

Phases of second training pattern signals CH(n−1)s' and CH(n+1)s' received through the channels CH(n−1) and CH(n+1) may be more delayed than phases of other second training pattern signals and may be more advanced than a phase of the second training pattern signal CHns'. A sampling clock signal CLK_r2 may be a signal of which a phase is adjusted such that a transition time point of the second training pattern signals CH(n−1)s' and CH(n+1)s' corresponds to the sampling time point sp_r2.

Because channels CH1 and CH(2n−1) positioned at an outermost side are least influenced by crosstalk-induced jitter, phases of second training pattern signals CH1s' and CH(2n−1)s' received through the channels CH1 and CH(2n−1) may be more advanced than phases of the other second training pattern signals. A sampling clock signal CLK_r1 may be a signal of which a phase is adjusted such that a transition time point of the second training pattern signals CH1s' and CH(2n−1)s' corresponds to a sampling time point sp_r1.

When sampling is performed at the sampling time point sp_r1 using the sampling clock signal CLK_r1, the sum level of each of first post cursors of previous signals prv_CH1s', and prv_CH(2n−1)s' and each of main cursors of current signals curr_CH1s' and curr_CH(2n−1)s' of the channels CH1 and CH(2n−1) is an intermediate level IL1 and has a sufficient margin with a second reference voltage VL1. Thus, there is no problem in decoding a binary level as 1.

However, the sum level of each of first post cursor of previous signals prv_CH(n−1)s' and prv_CH(n+1)s' and each of main cursors of current signals curr_CH(n−1)s' and curr_CH(n+1)s' of the channels CH(n−1) and CH(n+1) has an insufficient margin with the second reference voltage VL1. Thus, a binary level may be incorrectly decoded as 0. In addition, the sum level of a first post cursor of a previous signal prv_CHns' and a main cursor of a current signal curr_CHns' of the channel CHn is less than a level of the second reference voltage VL1. Thus, a binary level is incorrectly decoded as 0, thereby resulting in an error.

When sampling is performed at the sampling time point sp_r2 using the sampling clock signal CLK_r2, the sum level of each of first post cursors of previous signals prv_CH(n−1)s' and prv_CH(n+1)s' and each of main cursors of current signals curr_CH(n−1)s' and curr_CH(n+1)s' of the channels CH(n−1) and CH(n+1) is the intermediate level IL1 and has a sufficient margin with the second reference voltage VL1. Thus, there is no problem in decoding a binary level as 1.

In addition, the sum level of each of the first post cursors of the previous signals prv_CH1s' and prv_CH(2n−1)s' and each of the main cursors of the current signals curr_CH1s' and curr_CH(2n−1)s' of the channels CH1 and CH(2n−1) is greater than or equal to the intermediate level IL1 and has a more sufficient margin with the second reference voltage. Thus, there is no problem in decoding a binary level as 1.

However, the sum level of the first post cursor of the previous signal prv_CHns' and the main cursor of the current signal curr_CHns' of the channel CHn has an insufficient margin r2m with the second reference voltage VL1, and thus, there is a possibility in which a binary level is incorrectly decoded as 0.

When sampling is performed at the sampling time point sp_r3 using the sampling clock signal CLK_r3, the sum level of the first post cursor of the previous signal prv_CHns' and the main cursor of the current signal curr_CHns' of the channel CHn is the intermediate level IL1 and has a sufficient margin rm3 with the second reference voltage VL1. Thus, there is no problem in decoding a binary level as 1. Other channels CH1, CH(n−1), CH(n+1), and CH(2n−1) have a greater margin with the second reference voltage VL1, and thus, there is no problem in decoding a binary level as 1.

Therefore, even when the sampling clock signal CLK_r3 is generated using the second training pattern signal of the sensing channel CHn that is most influenced by crosstalk-induced jitter, it can be confirmed that there is no problem in accurately sampling data signals of other channels CH1, CH(n−1), CH(n+1), and CH(2n−1).

Figure 15:
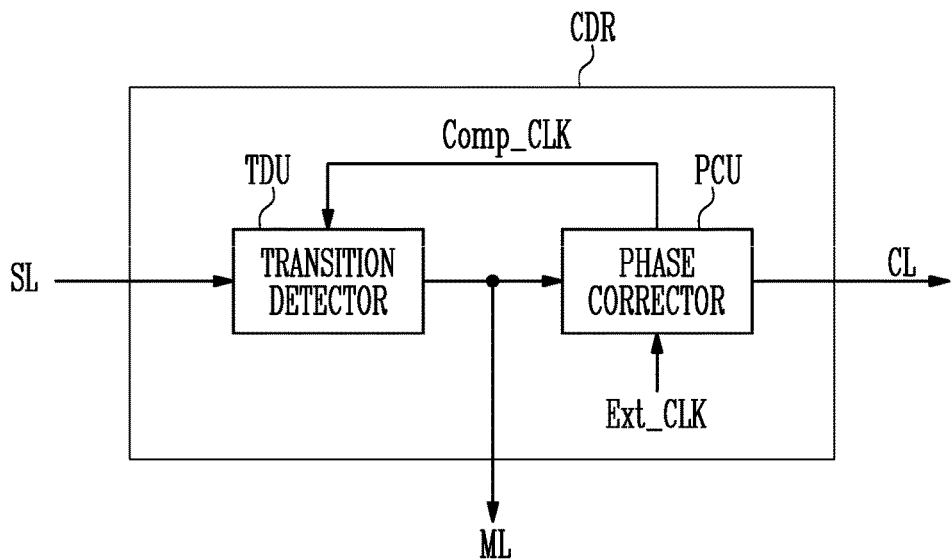
FIG. 15 is a diagram for describing a clock data recovery unit according to some example embodiments of the present invention.

FIG. 15 is a diagram for describing a clock data recovery unit according to some example embodiments of the present invention.

Referring to FIG. 15, a clock data recovery unit CDR may include a transition detector TDU and a phase corrector PCU.

The transition detector TDU may provide a mode signal corresponding to a training mode or a normal mode based on a training pattern signal and a compensation clock signal Comp_CLK. The training pattern signal may be a first training pattern signal or a second training pattern signal and may be received through a sensing line SL. The mode signal may be provided through a mode line ML.

The phase corrector PCU may generate at least one of the compensation clock signal Comp_CLK or a sampling clock signal based on the mode signal and an external clock signal Ext_CLK. The phase corrector PCU may generate a first compensation clock signal and a second compensation clock signal based on an external clock signal Ext_CLK. The compensation clock signal Comp_CLK may be provided to the transition detector TDU, and the sampling clock signal may be provided to the clock line CL.

First, when the training pattern signal is input, the transition detector TDU may provide a mode signal corresponding to the training mode. When the mode signal corresponding to the training mode is input, the phase corrector PCU may correct a phase of the external clock signal Ext_CLK to generate the compensation clock signal Comp_CLK.

Next, when a transition time point of the training pattern signal succeeds to be detected based on the compensation clock signal Comp_CLK in the training mode, the transition detector TDU may provide a mode signal corresponding to the normal mode. On the contrary, when the transition time point of the training pattern signal fails to be detected based on the compensation clock signal Comp_CLK in the training mode, the transition detector TDU may provide a mode signal corresponding to the training mode.

In this case, when the training mode is maintained, the phase corrector PCU may re-correct the phase of the external clock signal Ext_CLK to regenerate the compensation clock signal Comp_CLK. In addition, when the training mode ends and the normal mode starts, the phase corrector PCU may generate a sampling clock signal having the same phase as the current compensation clock signal Comp_CLK.

Figure 16:
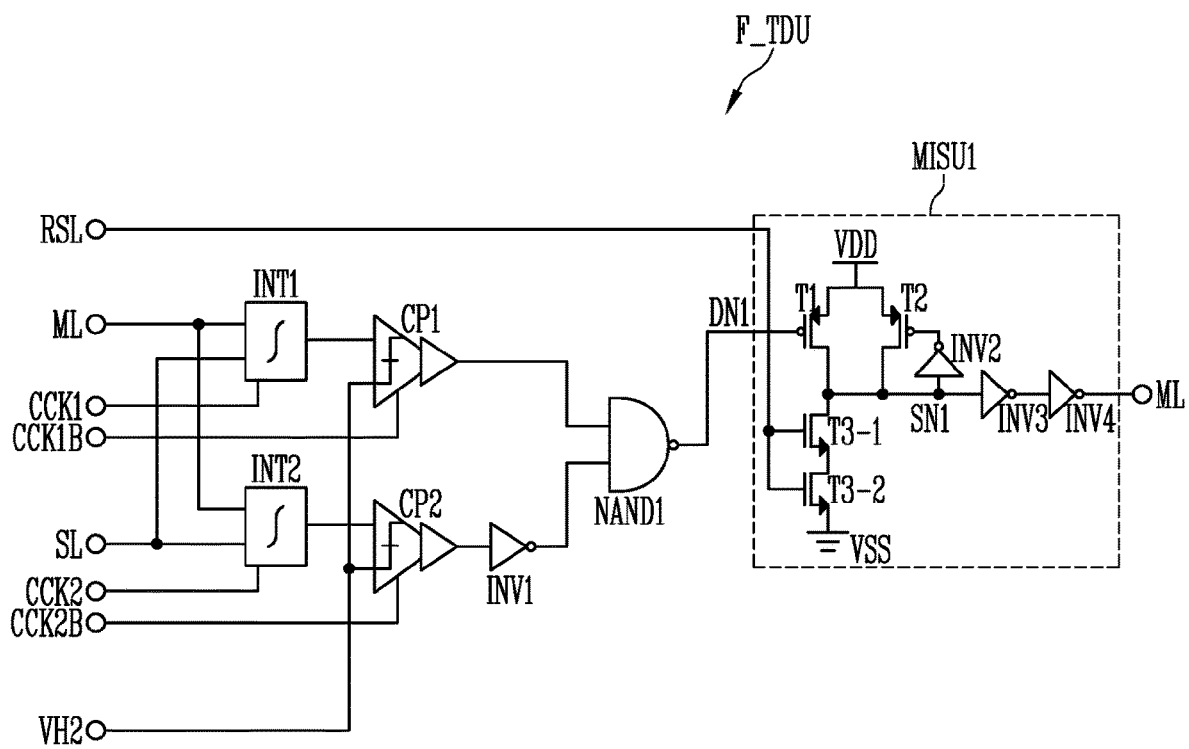
FIG. 16 is a diagram for describing a transition detector according to some example embodiments of the present invention.

FIG. 16 is a diagram for describing a transition detector according to some example embodiments of the present invention.

Referring to FIG. 16, a transition detector F_TDU according to some example embodiments of the present invention may include integrators INT1 and INT2, comparators CP1 and CP2, a first NAND gate NAND1, a first inverter INV1, and a first mode signal maintaining unit MISU1.

The transition detector F_TDU may receive first and second compensation clock signals CCK1 and CCK2 as the above-described compensation clock signal Comp_CLK. A phase of the second compensation clock signal CCK2 may be more delayed than a phase of the first compensation clock signal CCK1.

In addition, the transition detector F_TDU may receive a first training pattern signal through a sensing line SL.

The first integrator INT1 may provide a first integration signal by integrating the first training pattern signal according to the first compensation clock signal CCK1. For example, during a period in which the first compensation clock signal CCK1 is at a high level, the first integrator INT1 may provide the first integration signal by integrating the first training pattern signal.

The second integrator INT2 may provide a second integration signal by integrating the first training pattern signal according to the second compensation clock signal CCK2. For example, during a period in which the second compensation clock signal CCK2 is at a high level, the second integrator INT2 may provide the second integration signal by integrating the first training pattern signal.

According to some example embodiments, the integrators INT1 and INT2 may receive a first mode signal through a mode line ML, may be operated in response to a first mode signal of a training mode, and may be stopped in response to a first mode signal of a normal mode.

When the first integration signal is greater than a first reference voltage VH2, the first comparator CP1 may output a logic value of 1. When the first integration signal is less that the first reference voltage VH2, the first comparator CP1 may output a logic value of 0. For example, the first comparator CP1 may be operated when an inverted signal CCK1B of the first compensation clock signal CCK1 is at a high level, thereby comparing the first integration signal with the first reference voltage VH2.

When the second integration signal is greater than the first reference voltage VH2, the second comparator CP2 may output a logic value of 1. When the second integration signal is less that the first reference voltage VH2, the second comparator CP2 may output a logic value of 0. For example, the second comparator CP2 may be operated when an inverted signal CCK2B of the second compensation clock signal CCK2 is at a high level, thereby comparing the second integration signal with the first reference voltage VH2.

According to some example embodiments, each of the first and second comparators CP1 and CP2 may include a latch at a rear end thereof to maintain each output value for a certain period of time.

The first inverter INV1 may receive the output value of the second comparator CP2. The first inverter INV1 may output a logic value obtained by inverting the output value of the second comparator CP2.

The first NAND gate NAND1 may output a first detection signal based on output values of the first comparator CP1 and the first inverter INV1. For example, only when all of the output values of the first comparator CP1 and the first inverter INV1 are a logic value of 1, the first NAND gate NAND1 may output a logic value of 0 as the first detection signal, and, otherwise, the first NAND gate NAND1 may output a logic value of 1 as the first detection signal. The first detection signal may be applied to a first detection node DN1.

The first mode signal maintaining unit MISU1 may provide the first mode signal of the training mode in response to an initialization signal having a turn-on level. The first mode signal maintaining unit MISU1 may receive the initialization signal through an initialization line RSL and provide the first mode signal through the mode line ML.

According to some example embodiments, the first mode signal maintaining unit MISU1 may provide the first mode signal of the normal mode in response to the first detection signal having a first turn-on level after providing the initialization signal having a turn-on level and then may maintain the first mode signal of the normal mode regardless of a level change of the first detection signal.

That is, when the first mode signal maintaining unit MISU1 starts to provide the first mode signal of the normal mode based on the first detection signal, the first mode signal maintaining unit MISU1 may continuously provide the first mode signal of the normal mode regardless of the level change of the first detection signal.

According to some example embodiments, in order for the first mode signal maintaining unit MISU1 to provide the first mode signal of the training mode, it is necessary to receive the initialization signal having a turn-on level through the initialization line RSL.

Here, the "turn-on level" refers to a level of a signal capable of turning on a transistor to which a corresponding signal is applied. For example, because a first transistor T1, in which the first detection signal is applied to a gate electrode thereof, is a P-type transistor (for example, a P-type metal-oxide-semiconductor (PMOS) transistor), the turn-on level of the first detection signal may be a low level. In addition, because third transistors T3-1 and T3-2, in which the first detection signal is applied to gate electrodes thereof, is an N-type transistor (for example, an N-type metal-oxide-semiconductor (NMOS) transistor), the turn-on level of the first detection signal may be a high level.

According to some example embodiments, the first mode signal maintaining unit MISU1 may include transistors T1, T2, T3-1, and T3-2 and inverters INV2, INV3, and INV4.

The first transistor T1 may be include the gate electrode to which the first detection signal is applied, one electrode which is connected to a first power supply VDD, and the other electrode which is connected to a first sensing node SN1. The first transistor T1 may be a P-type transistor. The gate electrode of the first transistor T1 may be connected to the first detection node DN1.

A second transistor T2 may be include a gate electrode which is connected to an output terminal of a second inverter INV2, one electrode which is connected to the first power supply VDD, and the other electrode which is connected to the first sensing node SN1. The second transistor T2 may be a P-type transistor.

Each of the third transistors T3-1 and T3-2 may be include the gate electrode to which the initialization signal is applied, one electrode which is connected to the first second node SN1, and the other electrode which is connected to a second power supply VSS. The third transistors T3-1 and T3-2 may be N-type transistors. The gate electrodes of the third transistors T3-1 and T3-2 may be connected to the initialization line RSL. As shown in FIG. 16, the third transistors T3-1 and T3-2 may include two sub transistors T3-1 and T3-2. The second power supply VSS may have a voltage level lower than that of the first power supply VDD.

The second inverter INV2 may include an input terminal which is connected to the first sensing node SN1 and the output terminal which is connected to the gate electrode of the second transistor T2.

A third inverter INV3 may include an input terminal which is connected to the first sensing node SN1.

A fourth inverter INV4 may include an input terminal which is connected to an output terminal of the third inverter INV3 and may output the first mode signal. For example, the fourth inverter INV4 may include an output terminal which is connected to the mode line ML.

FIG. 17 is a diagram for describing an example first training pattern signal usable in the transition detector of FIG. 16.

A dotted line waveform of FIG. 17 refers to a waveform of a first training pattern signal F_TRP when the first training pattern signal F_TRP passes through a ideal channel, and a solid line waveform of FIG. 17 refers to a waveform of the first training pattern signal F_TRP when the first training pattern signal F_TRP passes through an actual channel.

One cycle (or one period) of the first training pattern signal F_TRP may be j+k-UI, and a binary level during a j-UI and a binary level during a k-UI may be different. In this case, j and k may be an integer greater than zero.

According to some example embodiments, k may be one. For example, the first training pattern signal F_TRP may include a falling pulse during one UI of one cycle and maintain a high level during the remaining UIs of one cycle.

In this case, because a transition does not occur during the j-UI and a voltage is charged in a channel, a first transition (falling transition) may not sufficiently occur during the short the k-UI. That is, the first training pattern signal F_TRP of FIG. 17 may correspond to a worst case of inter-symbol interference during a falling transition.

Therefore, when the first training pattern signal F_TRP corresponding to the worst case is transmitted to all channels at the same time (even mode) and a phase of a sampling clock signal is determined so as to detect a first transition in a sensing channel, it may be possible to acquire the phase of the sampling clock signal that is robust to both crosstalk-induced jitter and inter-symbol interference.

According to some example embodiments, because there is no need to apply pre-emphasis technique to transmission units TX1 to TX(2n−1), construction costs can be reduced.

Figure 18:
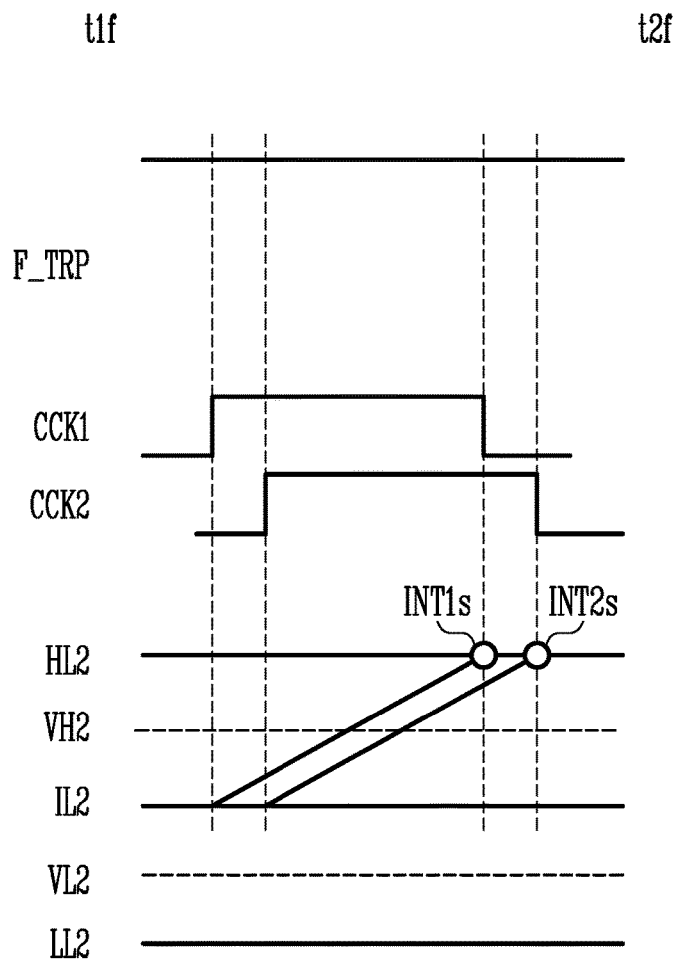
FIGS. 18 to 20 are diagrams for describing an operation of the transition detector of FIG. 16 based on a first training pattern signal.
Figure 19:
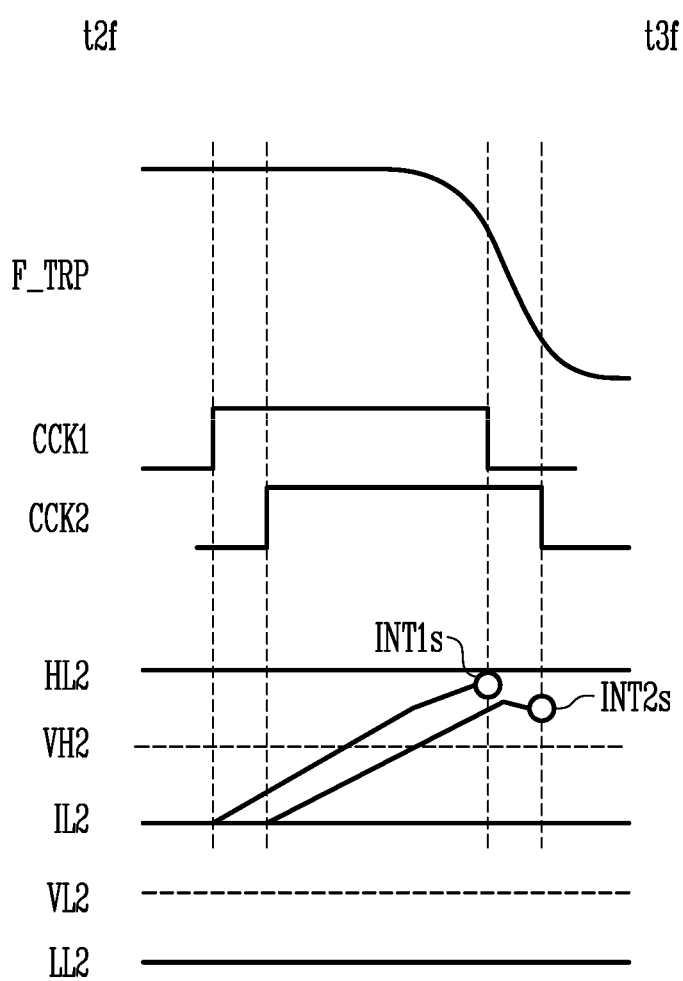
Figure 20:
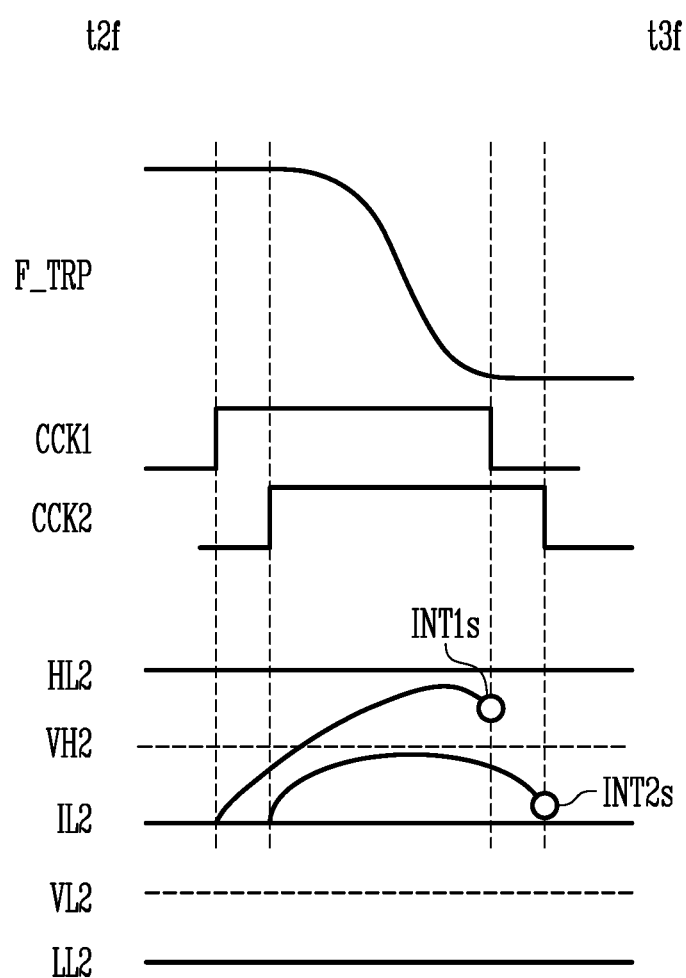

FIGS. 18 to 20 are diagrams for describing operations of the transition detector of FIG. 16 based on a first training pattern signal.

Specifically, FIG. 18 is a diagram for describing the operation of the transition detector F_TDU during a period t1$f$ to t2$f$ of FIG. 17, and FIGS. 19 and 20 are diagrams for describing the operation of the transition detector F_TDU during a period t2$f$ to t3$f$ of FIG. 17.

A first reference voltage VH2 may have an intermediate value between a highest level HL2 and an intermediate level IL2 among variable levels of integration signals INT1$s$ and INT2$s$. A second reference voltage VL2 may have an intermediate value between a lowest level LL2 and the intermediate level IL2 among the variable levels of the integration signals INT1$s$ and INT2$s$. Voltages HL2, VH2, IL2, VL2, and LL2 may be the same as or different from the voltages HL1, VH1, IL1, VL1, and LL1 described with reference to FIGS. 2 and 3.

When a first integration signal INT1$s$ is greater than the first reference voltage VH2 and a second integration signal INT2$s$ is less than the first reference voltage VH2, the transition detector F_TDU may detect generation of a first training pattern signal F_TRP.

For example, during a period in which a first compensation clock signal CCK1 is at a high level, the first integrator INT1 may generate the first integration signal INT1$s$ by integrating the first training pattern signal F_TRP. In addition, during a period in which a second compensation clock signal CCK2 is at a high level, the second integrator INT2 may generate the second integration signal INT2$s$ by integrating the first training pattern signal F_TRP.

According to some example embodiments, the integrators INT1 and INT2 are initialized when the corresponding compensation clock signals CCK1 and CCK2 are at a low level, and thus, an output value thereof may be initialized to the intermediate level IL2.

In the case of FIG. 18, during the period t1$f$ to t2$f$ in which no transition occurs, the first integration signal INT1$s$ and the second integration signal INT2$s$ may have the same magnitude.

In the case of FIG. 18, because the first and second integration signals INT1$s$ and INT2$s$ are greater than the first reference voltage VH2, both the first and second comparators CP1 and CP2 output a logic value of 1 Therefore, the first inverter INV1 outputs a logic value of 0, and the first NAND gate NAND1 outputs a logic value of 1. The first detection signal has a logic value of 1, and the first transistor T1 maintains a turn-off state. Accordingly, in the case of FIG. 18, the first mode signal of the training mode may be continuously output, and phases of the first and second compensation clock signals CCK1 and CCK2 may be adjusted by the phase corrector PCU.

In the case of FIG. 19 and FIG. 20, during the period t2$f$ to t3$f$ in which a transition occurs, the first integration signal INT1$s$ and the second integration signal INT2$s$ may have different magnitudes. For example, the second integration signal INT2$s$ may be less than the first integration signal INT1$s$.

Nevertheless, in the case of FIG. 19, because the first and second integration signals INT1$s$ and INT2$s$ are greater than the first reference voltage VH2, the first detection signal has a logic value of 1. Accordingly, in the case of FIG. 19, the first mode signal of the training mode is continuously output, and phases of the first and second compensation clock signals CCK1 and CCK2 may be adjusted by the phase corrector PCU.

In the case of FIG. 20, the first integration signal INT1s is greater than the first reference voltage VH2, and the second integration signal INT2s is less than the first reference voltage VH2. Therefore, the first comparator CP1 outputs a logical value of 1, and the second comparator CP2 outputs a logical value of 0. Therefore, the first inverter INV1 outputs a logic value of 1, and the first NAND gate NAND1 outputs a logic value of 0. The first detection signal has a logic value of 0, and the first transistor T1 is turned on.

Accordingly, a voltage of the first power supply VDD is charged in the first sensing node SN1, and a logic value of 1 is output as the first mode signal by the third and fourth inverters INV3 and INV4. The logic value of 1 of the first mode signal may refer to a normal mode, and the logic value of 0 thereof may refer to a training mode. Accordingly, the phase corrector PCU may generate a sampling clock signal having the same phase as the second compensation clock signal CCK2.

Thereafter, even when the first transistor T1 is turned on or off due to the logic value of the first detection signal being changed, the second transistor T2 maintains a turn-on state by the second inverter INV2, and thus, a voltage of the first sensing node SN1 is maintained. Therefore, the first mode signal of the normal mode is continuously output regardless of the change in logic value of the first detection signal.

Figure 21:
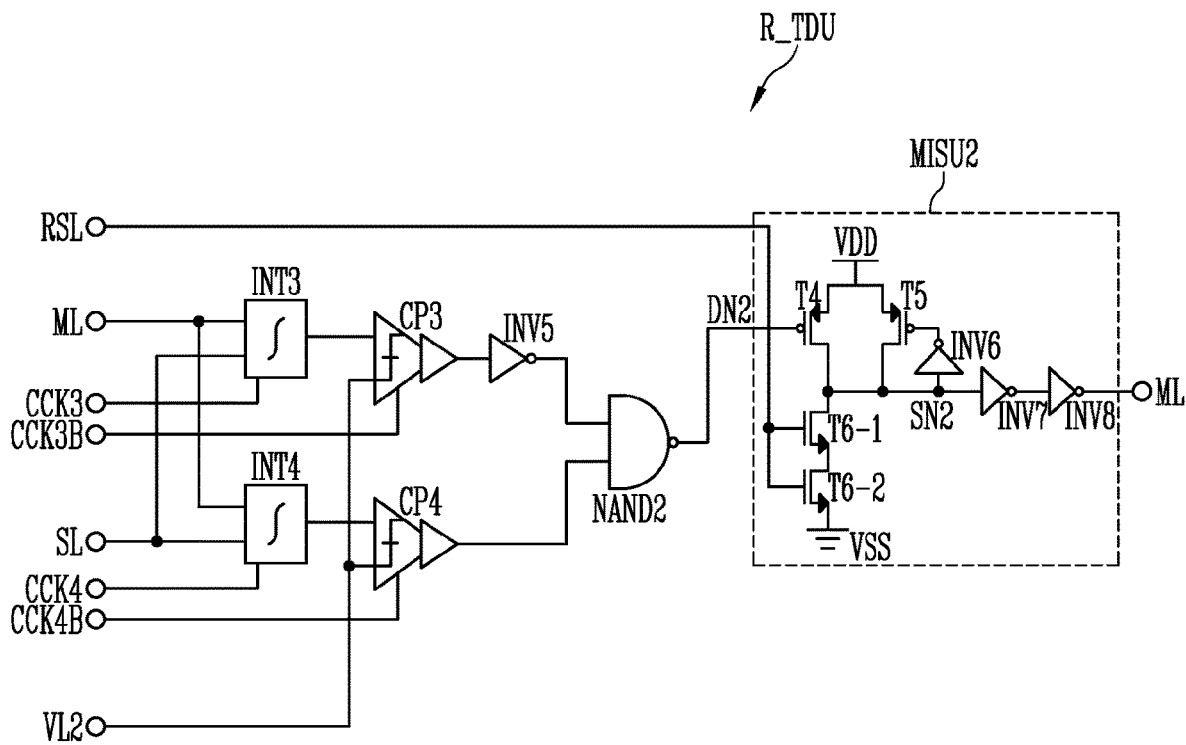
FIG. 21 is a diagram for describing a transition detector according to some example embodiments of the present invention.

FIG. 21 is a diagram for describing a transition detector according to some example embodiments of the present invention.

Referring to FIG. 21, a transition detector R_TDU according to some example embodiments of the present invention may include integrators INT3 and INT4, comparators CP3 and CP4, a fifth inverter INV5, a second NAND gate NAND2, and a second mode signal maintaining unit MISU2.

The transition detector R_TDU may receive third and fourth compensation clock signals CCK3 and CCK4 as the above-described compensation clock signal Comp_CLK. A phase of the fourth compensation clock signal CCK4 may be more delayed than a phase of the third compensation clock signal CCK3.

In addition, the transition detector R_TDU may receive a second training pattern signal through a sensing line SL.

A third integrator INT3 may provide a third integration signal by integrating the second training pattern signal according to the third compensation clock signal CCK3. For example, during a period in which the third compensation clock signal CCK3 is at a high level, the third integrator INT3 may provide the third integration signal by integrating the second training pattern signal.

A fourth integrator INT4 may provide a fourth integration signal by integrating the second training pattern signal according to the fourth compensation clock signal CCK4. For example, during a period in which the fourth compensation clock signal CCK4 is at a high level, the fourth integrator INT4 may provide the fourth integration signal by integrating the second training pattern signal.

According to some example embodiments, the integrators INT3 and INT4 may receive second mode signals through a mode line ML, may be operated in response to a second mode signal of a training mode, and may be stopped in response to a first mode signal of a normal mode.

When the third integration signal is greater than a second reference voltage VL2, the third comparator CP3 may output a logic value of 1. When the third integration signal is less than the second reference voltage VL2, the third comparator CP3 may output a logic value of 0. For example, the third comparator CP3 may be operated when an inverted signal CCK3B of the third compensation clock signal CCK3 is at a high level, thereby comparing the third integration signal with the second reference voltage VL2.

When the fourth integration signal is greater than the second reference voltage VL2, the fourth comparator CP4 may output a logic value of 1. When the fourth integration signal is less than the second reference voltage VL2, the fourth comparator CP4 may output a logic value of 0. For example, the fourth comparator CP4 may be operated when an inverted signal CCK4B of the fourth compensation clock signal CCK4 is at a high level, thereby comparing the fourth integration signal with the second reference voltage VL2.

According to some example embodiments, each of the third and fourth comparators CP3 and CP4 may include a latch at a rear end thereof to maintain each output value for a certain period of time.

The fifth inverter INV5 may receive the output value of the third comparator CP3. The fifth inverter INV5 may output a logic value obtained by inverting the output value of the third comparator CP3.

The second NAND gate NAND2 may output a second detection signal based on output values of the fifth inverter INV5 and the fourth comparator CP4. For example, only when all of the output values of the fifth inverter INV5 and the fourth inverter CP4 are a logic value of 1, the second NAND gate NAND2 may output a logic value of 0 as the second detection signal, and, otherwise, the second NAND gate NAND2 may output a logic value of 1 as the first detection signal. The second detection signal may be applied to a second detection node DN2.

The second mode signal maintaining unit MISU2 may provide the second mode signal of the training mode in response to an initialization signal having a turn-on level. The second mode signal maintaining unit MISU2 may receive the initialization signal through an initialization line RSL and provide the second mode signal through the mode line ML.

According to some example embodiments, after the second mode signal maintaining unit MISU2 provides the initialization signal having a turn-on level, the second mode signal maintaining unit MISU2 may provide the second mode signal of the normal mode in response to the second detection signal having a first turn-on level and then may maintain the second mode signal of the normal mode regardless of a level change of the second detection signal.

That is, when the second mode signal maintaining unit MISU2 starts to provide the second mode signal of the normal mode based on the second detection signal, the second mode signal maintaining unit MISU2 may continuously provide the second mode signal of the normal mode regardless of the level change of the second detection signal. According to some example embodiments, in order for the second mode signal maintaining unit MISU2 to provide the second mode signal of the training mode, it is necessary to receive the initialization signal having a turn-on level through the initialization line RSL.

According to some example embodiments, the second mode signal maintaining unit MISU2 may include transistors T4, T5, T6-1, and T6-2 and inverters INV6, INV7, and INV8.

A fourth transistor T4 may be include a gate electrode to which the second detection signal is applied, one electrode which is connected to a first power supply VDD, and the other electrode which is connected to a second sensing node SN2. The fourth transistor T4 may be a P-type transistor. The gate electrode of the fourth transistor T4 may be connected to the second detection node DN2.

A fifth transistor T5 may be include a gate electrode which is connected to an output terminal of a sixth inverter INV6, one electrode which is connected to the first power supply VDD, and the other electrode which is connected to the second sensing node SN2. A fifth transistor T5 may be a P-type transistor.

Each of sixth transistors T6-1 and T6-2 may be include a gate electrode to which the initialization signal is applied, one electrode which is connected to the second sensing node SN2, and the other electrode which is connected to a second power supply VSS. The sixth transistors T6-1 and T6-2 may be N-type transistors. The gate electrodes of the sixth transistors T6-1 and T6-2 may be connected to the initialization line RSL. As shown in FIG. 21, the sixth transistors T6-1 and T6-2 may include two sub transistors T6-1 and T6-2.

The sixth inverter INV6 may include an input terminal which is connected to the second sensing node SN2 and the output terminal which is connected to the gate electrode of the sixth transistor T5.

A seven inverter INV7 may include an input terminal which is connected to the second sensing node SN2.

A eighth inverter INV8 may include an input terminal which is connected to the second sensing node SN2 and may output the second mode signal. For example, the eighth inverter INV8 may include an output terminal which is connected to the mode line ML.

FIG. 22 is a diagram for describing an example second training pattern signal usable in the transition detector of FIG. 21.

A dotted line waveform of FIG. 22 refers to a waveform of a second training pattern signal R_TRP when the second training pattern signal R_TRP passes through a ideal channel, and a solid line waveform of FIG. 122 refers to a waveform of the second training pattern signal T_TRP when the second training pattern signal R_TRP passes through an actual channel.

One cycle of the second training pattern signal R_TRP may be j+k-UI, and a binary level during a j-UI and a binary level during a k U-I may be different. In this case, j and k may be an integer greater than zero.

According to some example embodiments, k may be one. For example, the second training pattern signal R_TRP may include a rising pulse during one UI of one cycle and maintain a low level during the remaining UIs of one cycle.

In this case, because a transition does not occur during the j-UI and a voltage is discharged in a channel, a second transition (rising transition) may not sufficiently occur during the short k-UI. That is, the second training pattern signal R_TRP of FIG. 22 may correspond to a worst case of inter-symbol interference during a rising transition Therefore, when the second training pattern signal R_TRP corresponding to the worst case is transmitted to all channels at the same time (even mode) and a phase of a sampling clock signal is determined so as to detect a second transition in a sensing channel, it may be possible to acquire the phase of the sampling clock signal that is robust to both crosstalk-induced jitter and inter-symbol interference.

According to some example embodiments, because there is no need to apply pre-emphasis technique to transmission units TX1 to TX(2n–1), construction costs may be reduced.

When a third integration signal is less than a second reference voltage VL2 and a fourth integration signal is greater than the second reference voltage VL2, the transition detector R_TDU of FIG. 21 may detect occurrence of a transition of the second training pattern signal R_TRP. The detailed operation of the transition detector R_TDU is similar to that of the transition detector F_TDU of FIG. 16, and thus, redundant descriptions thereof are omitted. For reference, because the first training pattern signal F_TRP maintains a high level for a relatively long time, the transition detector F_TDU may be operated based on the first reference voltage VH2, and because the second training pattern signal R_TRP maintains a low level for a relatively long time, the transition detector R_TDU may be operated based on the second reference voltage VL2.

As described so far, the transition detector TDU of FIG. 15 may include any one of the transition detector F_TDU of FIG. 16 and the transition detector R_TDU of FIG. 22.

For example, when the transition detector TDU includes only the transition detector F_TDU of FIG. 16, the clock data recovery unit CDR may provide the second compensation clock signal CCK2, which has a phase when a transition is detected, as a sampling clock signal. For example, when the transition detector TDU includes only the transition detector R_TDU of FIG. 22, the clock data recovery unit CDR may provide the fourth compensation clock signal CCK4, which has a phase when a transition is detected, as a sampling clock signal.

According to some example embodiments, the transition detector TDU of FIG. 15 may include all of the transition detectors F_TDU and R_TDU.

For example, the clock data recovery unit CDR may transmit the first mode signal of the training mode to the mode line ML. When the transmission units TX1 to TX(2n–1) receive the first mode signal of the training mode, the transmission units TX1 to TX(2n–1) may transmit the first training pattern signal F-TRP.

Accordingly, the clock data recovery unit CDR may operate the transition detector F_TDU, and the first mode signal of the normal mode may be output to the mode line ML. In this case, the clock data recovery unit CDR may store a phase of the second compensation clock signal CCK2 as a first phase.

Next, the clock data recovery unit CDR may transmit the second mode signal of the training mode to the mode line ML. When the transmission units TX1 to TX(2n–1) receive the second mode signal of the training mode, the transmission units TX1 to TX(2n–1) may transmit the second training pattern signal R-TRP.

Accordingly, the clock data recovery unit CDR may operate the transition detector R_TDU, and the second mode signal of the normal mode may be output to the mode line ML. In this case, the clock data recovery unit CDR may store a phase of the fourth compensation clock signal CCK4 as a second phase.

The clock data recovery unit CDR may provide a compensation clock signal having a more delayed phase of the first phase and the second phase as a sampling clock signal. For example, when the first phase is more delayed than the second phase, the second compensation clock signal CCK2 is provided as a sampling clock signal, and when the second phase is more delayed than the first phase, the fourth compensation clock signal CCK4 may be provided as a sampling clock signal. The descriptions of FIGS. 12 and 14 may be referenced for a reason for selecting a more delayed phase. According to some example embodiments, it may be possible to acquire a phase of a sampling clock signal that is robust to both of a falling transition and a rising transition.

A transition detector and a clock data recovery unit including the same according to the present invention can recover a clock signal that is robust to cross-symbol interference and crosstalk-induced jitter.

The referenced drawings and the detailed description of the invention are provided merely for the purpose of explaining example embodiments of the invention, and are not intended to limit the technical scope of the invention defined by the following claims. Therefore, an ordinary skilled person in the art will understand that a variety of changes and equivalent embodiments can be made from the foregoing description. The technical scope of the invention should thus be defined by the technical ideas of the following claims and their equivalents.

What is claimed is:

1. A clock data recovery unit comprising:
   a phase corrector generating a first compensation clock signal and a second compensation clock signal based on an external clock signal; and
   a transition detector,
   wherein the transition detector comprises:
   a first integrator configured to integrate a first training pattern signal according to the first compensation clock signal to provide a first integration signal; and
   a second integrator configured to integrate the first training pattern signal according to the second compensation clock signal to provide a second integration signal,
   wherein, in response to the first integration signal being greater than a first reference voltage and the second integration signal being less than the first reference voltage, occurrence of a transition of the first training pattern signal is detected.

2. The clock data recovery unit of claim 1, wherein a phase of the second compensation clock signal is more delayed than a phase of the first compensation clock signal.

3. The clock data recovery unit of claim 2, wherein the transition detector further comprises:
   a first comparator configured to output a logic value of 1 in response to the first integration signal being greater than the first reference voltage and to output a logic value of 0 in response to the first integration signal being less than the first reference voltage; and
   a second comparator configured to output a logic value of 1 in response to the second integration signal being greater than the first reference voltage and to output a logic value of 0 in response to the second integration signal being less than the first reference voltage.

4. The clock data recovery unit of claim 3 wherein the transition detector further comprises a first inverter configured to receive an output value of the second comparator.

5. The clock data recovery unit of claim 4, wherein the transition detector further comprises a first NAND gate configured to output a first detection signal based on output values of the first comparator and the first inverter.

6. The clock data recovery unit of claim 5, wherein the transition detector further comprises a first mode signal maintaining unit configured to provide a first mode signal of a training mode in response to an initialization signal having a turn-on level, and
   wherein the first mode signal maintaining unit is configured to provide the first mode signal of a normal mode in response to the first detection signal having a first turn-on level after providing the initialization signal having a turn-on level and then to maintain the first mode signal of the normal mode regardless of a level change of the first detection signal.

7. The clock data recovery unit of claim 6, wherein the first mode signal maintaining unit includes:
   a first transistor including a gate electrode configured to receive the first detection signal, a first electrode connected to a first power supply, and a second electrode connected to a first sensing node;
   a second transistor including a first electrode connected to the first power supply and a second electrode connected to the first sensing node;
   a third transistor including a gate electrode configured to receive the initialization signal, a first electrode connected to the first sensing node, and a second electrode connected to a second power supply; and
   a second inverter including an input terminal connected to the first sensing node and an output terminal which is connected to a gate electrode of the second transistor.

8. The clock data recovery unit of claim 7, wherein the first mode signal maintaining unit further includes:
   a third inverter including an input terminal connected to the first sensing node; and
   a fourth inverter including an input terminal connected to an output terminal of the third inverter and configured to output the first mode signal.

9. The clock data recovery unit of claim 8 wherein the transition detector further comprises:
   a third integrator configured to integrate a second training pattern signal according to a third compensation clock signal to provide a third integration signal; and
   a fourth integrator configured to integrate the second training pattern signal according to a fourth compensation clock signal to provide a fourth integration signal,
   wherein, in response to the third integration signal being less than a second reference voltage and the fourth integration signal being greater than the second reference voltage, occurrence of a transition of the second training pattern signal is detected.

10. The clock data recovery unit of claim 9, wherein the transition detector further comprises:
    a third comparator configured to output a logic value of 1 in response to the third integration signal being greater than the second reference voltage and to output a logic value of 0 in response to the third integration signal being less than the second reference voltage; and
    a fourth comparator configured to output a logic value of 1 in response to the fourth integration signal being greater than the second reference voltage and to output a logic value of 0 in response to the fourth integration signal being less than the second reference voltage.

11. The clock data recovery unit of claim 10, wherein the transition detector further comprises:
    a fifth inverter configured to receive an output value of the third comparator; and
    a second NAND gate configured to output a second detection signal based on output values of the fifth inverter and the fourth comparator.

12. The clock data recovery unit of claim 11, wherein the transition detector further comprises a second mode signal maintaining unit configured to provide a second mode signal of the training mode in response to the initialization signal having a turn-on level,
    wherein the second mode signal maintaining unit is configured to provide the first mode signal of the normal mode in response to the second detection signal having a first turn-on level after providing the initialization signal having a turn-on level and then to maintain the second mode signal of the normal mode regardless of a level change of the second detection signal.

13. The clock data recovery unit of claim 12, wherein the second mode signal maintaining unit includes:
- a fourth transistor including a gate electrode configured to receive the second detection signal, a first electrode connected to the first power supply, and a second electrode connected to a second sensing node;
- a fifth transistor including a first electrode connected to the first power supply and a second electrode connected to the second sensing node;
- a sixth transistor including a gate electrode configured to receive the initialization signal, a first electrode connected to the second sensing node, and a second electrode connected to the second power supply;
- a sixth inverter including an input terminal connected to the second sensing node and an output terminal connected to a gate electrode of the fifth transistor;
- a seventh inverter including an input terminal connected to the second sensing node; and
- an eighth inverter including an input terminal connected to an output terminal of the seventh inverter and configured to output the second mode signal.

14. The clock data recovery unit of claim 13, wherein the first training pattern signal includes a falling pulse during one unit interval (UI) of one cycle and maintains a high level during the remaining UIs of the one cycle, and
- the second training pattern signal includes a rising pulse during one UI of one cycle and maintains a low level during the remaining UIs of the one cycle.

15. The clock data recovery unit of claim 14, wherein the first training pattern signal includes the falling pulse during one UI of one cycle, and
- the second training pattern signal includes the rising pulse during one UI of the one cycle.

16. A clock data recovery unit comprising:
- a phase corrector generating a first compensation clock signal and a second compensation clock signal based on an external clock signal; and
- a transition detector,
- wherein the transition detector comprises:
  - a first integrator configured to integrate a first training pattern signal according to the first compensation clock signal to provide a first integration signal; and
  - a second integrator configured to integrate the first training pattern signal according to the second compensation clock signal, of which a phase is more delayed than a phase of the first compensation clock signal, to provide a second integration signal,
- wherein, in response to the first integration signal being greater than a first reference voltage and the second integration signal being less than the first reference voltage, the phase of the second compensation clock signal is stored as a first phase.

17. The clock data recovery unit of claim 16, wherein the transition detector further comprises:
- a third integrator configured to integrate a second training pattern signal to provide a third integration signal; and
- a fourth integrator configured to integrate the second training pattern signal according to a fourth compensation clock signal to provide a fourth integration signal,
- wherein, in response to the third integration signal being less than a second reference voltage and the fourth integration signal being greater than the second reference voltage, a phase of the fourth compensation clock signal is stored as a second phase.

18. The clock data recovery unit of claim 17, wherein, in response to the first phase being more delayed than the second phase, the second compensation clock signal is provided as a sampling clock signal, and
- in response to the second phase being more delayed than the first phase, the fourth compensation clock signal is provided as a sampling clock signal.

19. The clock data recovery unit of claim 18, wherein the first training pattern signal includes a falling pulse during one UI of one cycle and maintains a high level during the remaining UIs of the one cycle, and
- the second training pattern signal includes a rising pulse during one UI of one cycle and maintains a low level during the remaining UIs of the one cycle.

\* \* \* \* \*